(12) United States Patent
Maegawa et al.

(10) Patent No.: US 8,143,854 B2
(45) Date of Patent: Mar. 27, 2012

(54) ADJUSTING METHOD OF BATTERY PACK AND ADJUSTING METHOD OF BATTERY PACK WITH CONTROLLER

(75) Inventors: Katsunori Maegawa, Toyohashi (JP); Motoyoshi Okumura, Chiryu (JP)

(73) Assignee: Panasonic Ev Energy Co., Ltd., Kosai (JP)

( * ) Notice: Subject to any disclaimer, the term of this patent is extended or adjusted under 35 U.S.C. 154(b) by 723 days.

(21) Appl. No.: 12/149,161

(22) Filed: Apr. 28, 2008

(65) Prior Publication Data

US 2008/0278114 A1 Nov. 13, 2008

(30) Foreign Application Priority Data

May 11, 2007 (JP) ................................. 2007-127200
Feb. 22, 2008 (JP) ................................. 2008-042170

(51) Int. Cl.
*H02J 7/00* (2006.01)
(52) U.S. Cl. ......... 320/125; 320/124; 324/433; 324/434
(58) Field of Classification Search .................. 320/124, 320/125; 324/433–434
See application file for complete search history.

(56) References Cited

U.S. PATENT DOCUMENTS

| | | | | |
|---|---|---|---|---|
| 4,371,825 A * | 2/1983 | Chi et al. | ...................... | 320/118 |
| 6,452,362 B1 * | 9/2002 | Choo | ............................. | 320/116 |
| 7,453,237 B2 * | 11/2008 | Yamamoto | .................... | 320/118 |
| 7,859,227 B2 * | 12/2010 | Saigo | ............................. | 320/136 |
| 2006/0091854 A1 * | 5/2006 | Chen et al. | ..................... | 320/116 |

FOREIGN PATENT DOCUMENTS

JP A-2004-185915 7/2004

* cited by examiner

*Primary Examiner* — Samuel Berhanu
(74) *Attorney, Agent, or Firm* — Oliff & Berridge, PLC

(57) ABSTRACT

The invention provides a method of adjusting a battery pack capable of reducing a difference in charge level between a plurality of secondary batteries constituting the battery pack and capable of restraining an increase in battery voltage difference between the secondary batteries of the battery pack in association with the adjustment of the charge level. A method of adjusting a battery pack includes a first adjusting process for discharging all secondary batteries of a first battery group so that charge levels of the secondary batteries of the first battery group fall within a charge level range determined based on a charge level of a secondary battery of a second battery group and further a second adjusting process for discharging all the secondary batteries of the first and second battery groups by the same electric quantity respectively.

4 Claims, 27 Drawing Sheets

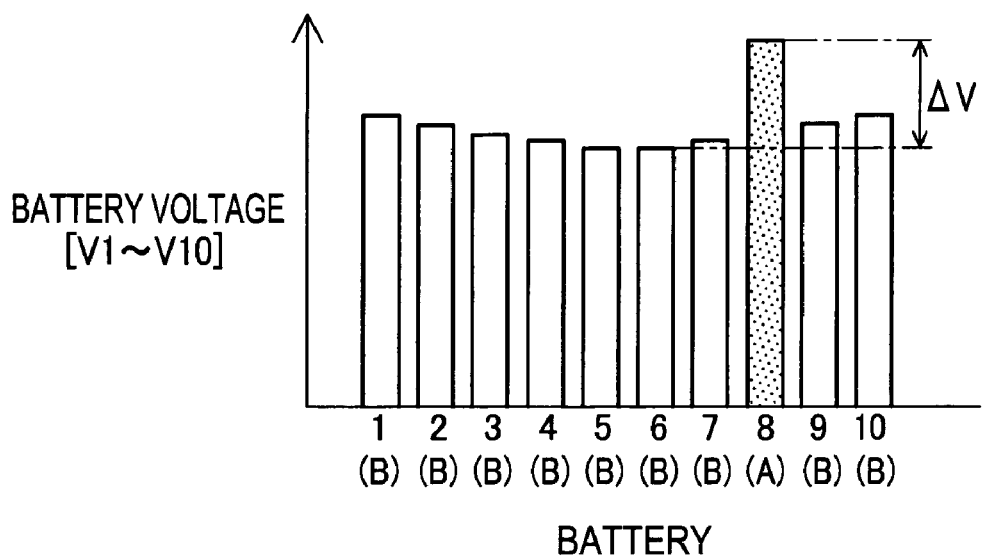
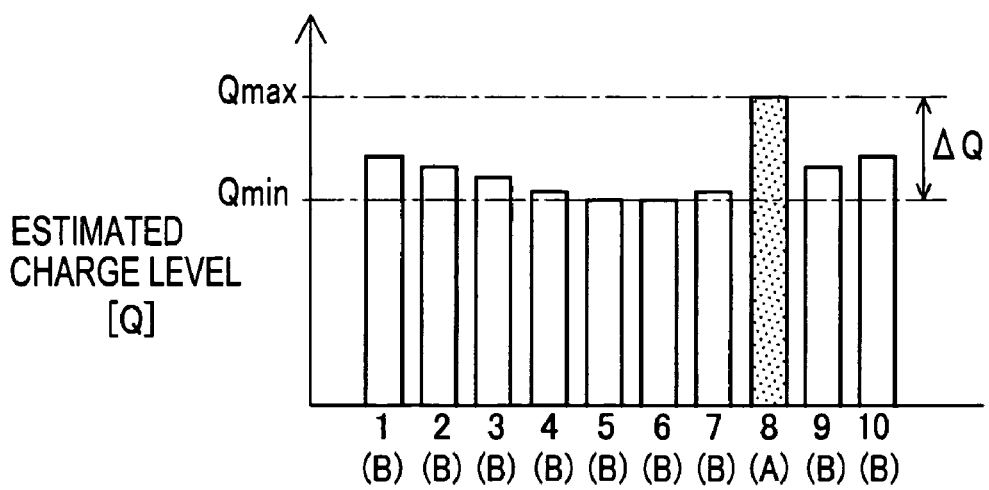

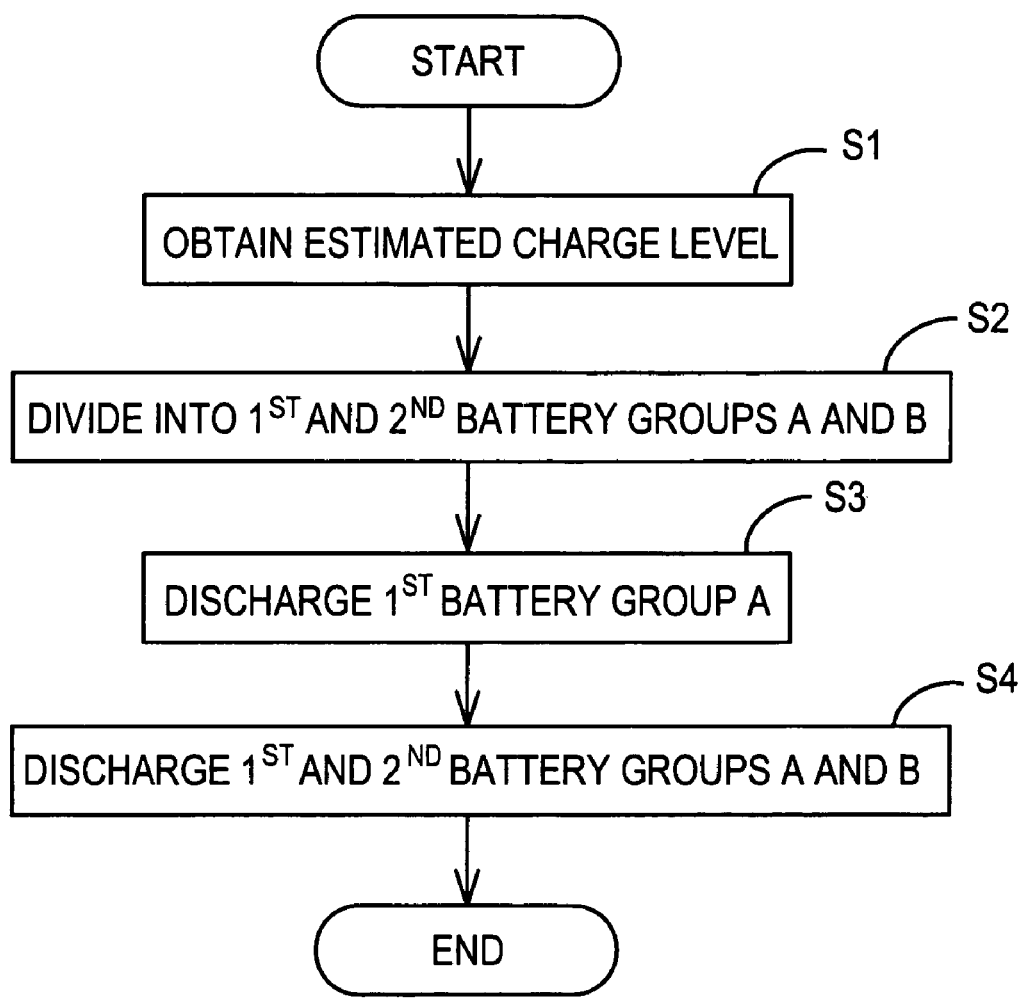

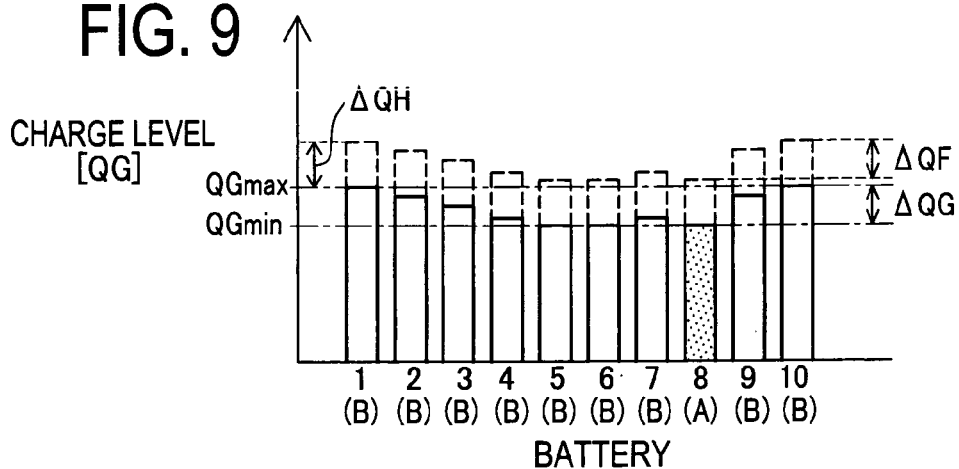
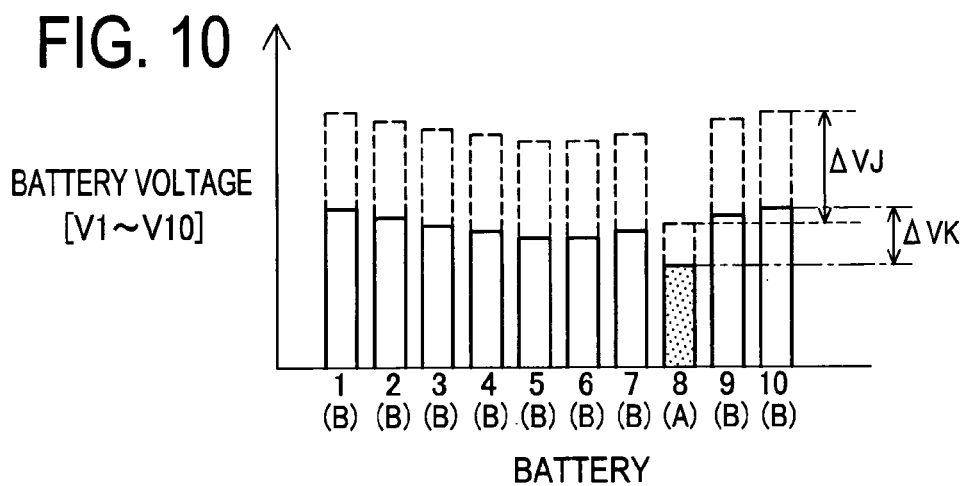
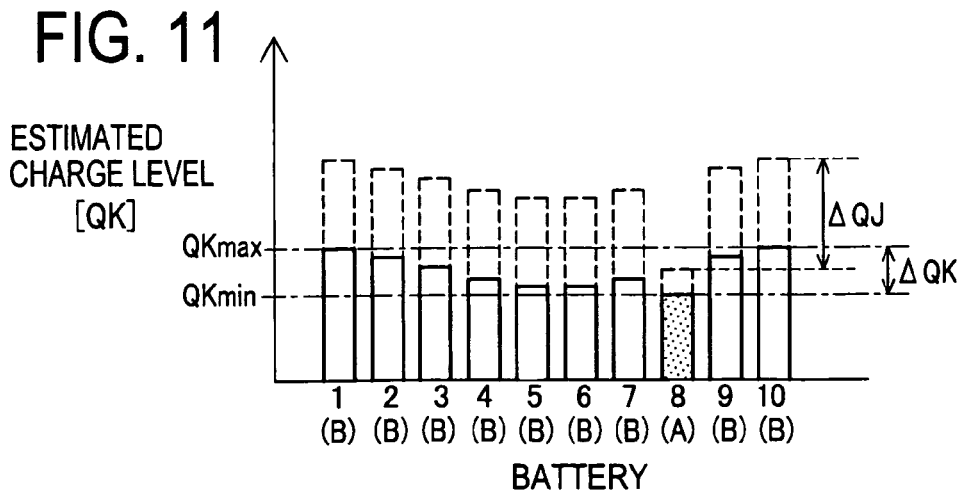

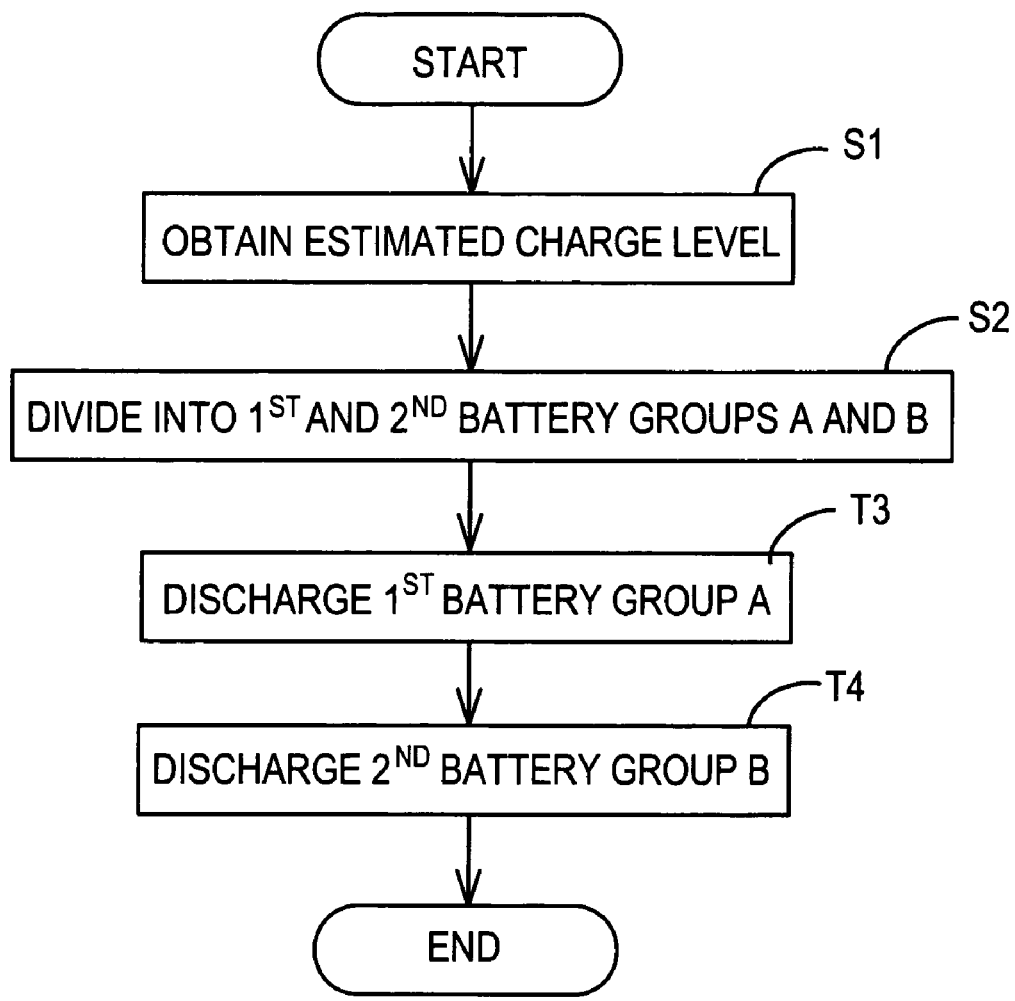

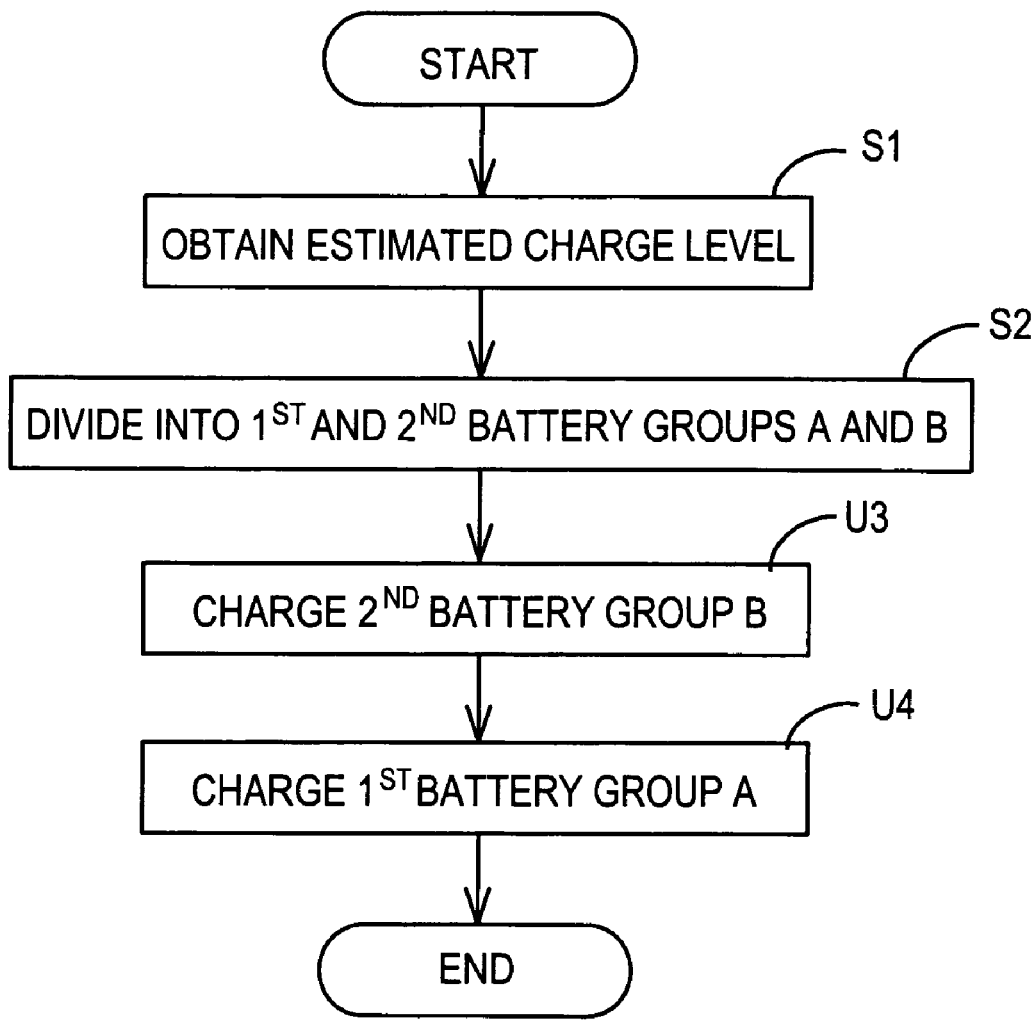

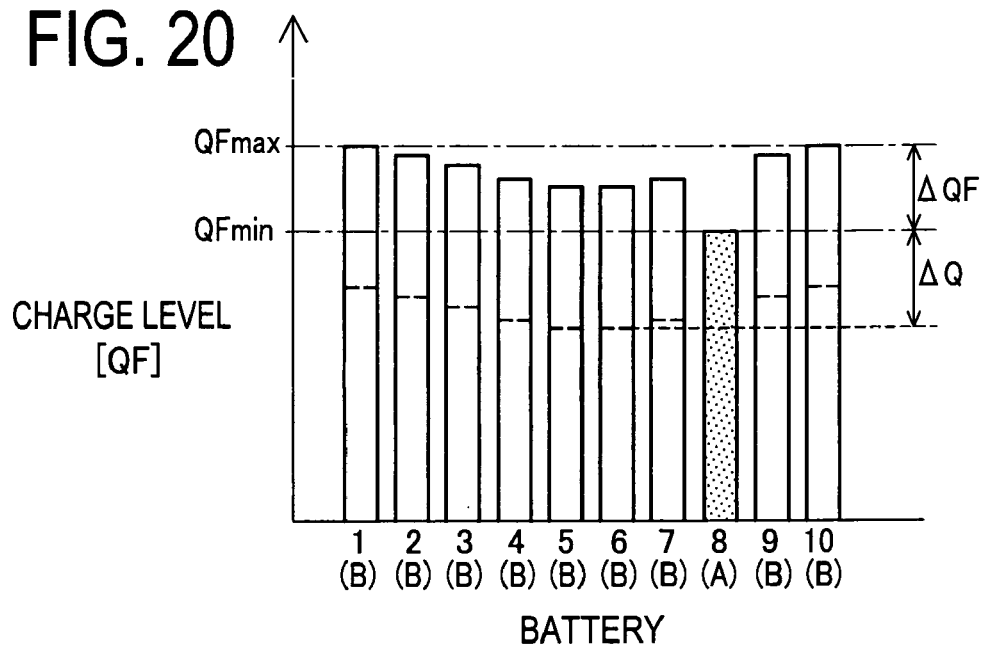
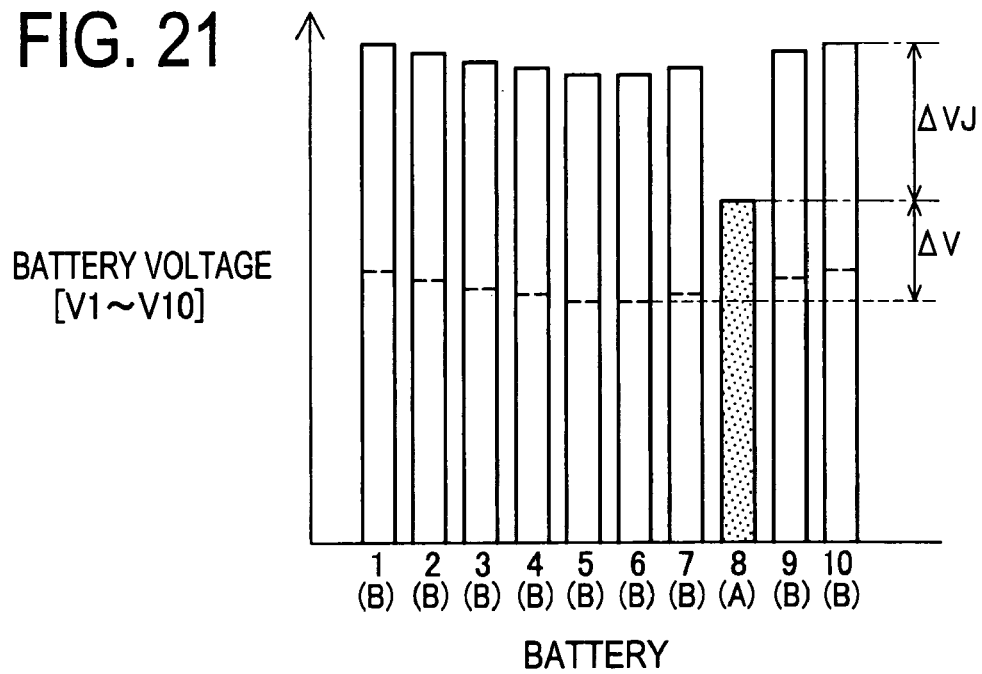

ADJUSTING METHOD OF BATTERY PACK AND ADJUSTING METHOD OF BATTERY PACK WITH CONTROLLER

BACKGROUND OF THE INVENTION

1. Field of the Invention

The present invention relates to an adjusting method of a battery pack and an adjusting method of a battery pack with a controller.

2. Description of Related Art

Recently, there have been proposed various secondary batteries as a power source of a portable device, a mobile device, and the like or a power source of an electric vehicle, a hybrid electric vehicle, and the like. In the case where this secondary battery is used as a power source of the electric vehicle, the hybrid electric vehicle, and the like, which demands high output power, a plurality of secondary batteries is electrically connected in series to constitute a battery pack.

Meanwhile, in the battery pack used as the power source of the electric vehicle, the hybrid electric vehicle, and the like, some of the secondary batteries constituting the battery pack may come to the end of their lives or be damaged earlier than other secondary batteries due to their use environment, differences in characteristics between secondary batteries of the battery pack, defects of components of each secondary battery. This may cause troubles that the battery pack could not bring out its inherent performance, leading to abnormal conditions of the entire system. To solve such troubles, there may be a case where the secondary battery that has come to the end of its life or has been broken earlier than other batteries is replaced with a normal one. This replacement method of secondary battery has been proposed variously (e.g. JP2004-185915A).

JP'915A discloses a method of replacing some secondary batteries of a battery pack, which includes a plurality of secondary batteries electrically connected in series or in parallel, with new ones by reducing a charge level of the new secondary battery than charge levels of other batteries not to be replaced (i.e. existing normal secondary batteries of the battery pack). JP'915A teaches the following concrete configuration. The new secondary battery for replacement is charged in advance so that the charge level of the new secondary battery is lower by 5% to 20% than the charge levels of the existing batteries not to be replaced. As charge and discharge is repeated during use of the battery pack, accordingly, a difference in the charge level (electric quantity) between the new secondary battery and other secondary batteries becomes smaller and consequently the charge levels of secondary batteries of the battery pack can be made equal to one another. JP'915A mentions that the performance of the battery pack can be enhanced to the maximum.

Meanwhile, for mounting on the electric vehicle, the hybrid electric vehicle, and the like, the battery pack is sometimes mounted in the form of a battery pack with a battery controller for detecting battery voltage (electromotive force) and temperature of each secondary battery of the battery pack, estimating a charge level (a charged electric quantity) based on those detected values, and monitoring whether the presence of a secondary battery whose charge level is abnormal. When a battery pack in which secondary batteries are replaced according to the method of JP'915A is used for this battery pack with controller (controller-equipped battery pack), the battery controller might detect an abnormal charge level of the secondary battery.

For instance, in the case where a charge level of a new secondary battery is too lower than that of other batteries at the time of battery replacement, abnormality in charge level may be detected just after the controller-equipped battery pack is mounted on a hybrid electric vehicle or the like. This is because the new secondary battery has been reduced in charge level by up to 20% as compared with other batteries and thus battery voltage may also have been reduced as compared with other batteries.

Further, the new secondary battery is superior in charge-discharge characteristics to other existing batteries not replaced. If the battery pack is used for a long period with repeat of charge and discharge, the charge level of the new secondary battery may become larger than the charge levels of other secondary batteries. As a result, the battery controller judges that the charge level of the new secondary battery is too larger than the charge levels of other batteries and determines the charge level of the new secondary battery to be abnormal.

If the secondary batteries of the battery pack include some secondary batteries whose charge levels have become too larger than other batteries, for example, the corresponding secondary battery or batteries are discharged so that the charge level(s) thereof comes close to the charge levels of other secondary batteries. This is because the performance of the battery pack can be brought out. However, such adjustment of charge level could solve the charge level problem but cause the following disadvantages. Specifically, the level of battery voltage of the discharged secondary battery would be excessively decreased as compared with the battery voltage of other secondary batteries (a battery voltage difference would exceed a normal range). Thus, the battery controller may judge the battery voltage as abnormal and determine that the charge level estimated based on the battery voltage is abnormal.

SUMMARY OF THE INVENTION

The present invention has been made in view of the above circumstances and has an object to provide a method of adjusting a battery pack capable of reducing a difference in charge level between a plurality of secondary batteries constituting the battery pack and capable of restraining an increase in battery voltage difference between the secondary batteries of the battery pack in association with the adjustment of the charge level.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a method of adjusting a battery pack including a plurality of secondary batteries divided into a first battery group and a second battery group according to charge levels before adjustment so that the first battery group includes one or more secondary batteries each having a high charge level and the second battery group includes one or more secondary batteries each having a lower charge level than that of the first battery group, the method being adapted to reduce a difference in charge level between the one or more secondary batteries of the first battery group and the one or more secondary batteries of the second battery group, wherein the method comprises: a first adjusting process for discharging the one or more secondary batteries of the first battery group so that the charge level of the one or more secondary batteries of the first battery group falls within a charge level range determined based on the charge level of the one or more secondary batteries of the second battery group; and a second adjusting process for discharging all the secondary batteries of the first and second battery groups by the same electric quantity respectively.

Alternatively, the invention provides a method of adjusting a battery pack including a plurality of secondary batteries divided into a first battery group and a second battery group according to charge levels before adjustment so that the first battery group includes one or more secondary batteries each having a high charge level and the second battery group includes one or more secondary batteries each having a lower charge level than that of the first battery group, the method being adapted to reduce a difference in charge level between the one or more secondary batteries of the first battery group and the one or more secondary batteries of the second battery group, wherein the method comprises: a first adjusting process for charging the secondary batteries of the second battery group by the same electric quantity respectively so that the charge level of the one or more secondary batteries of the first battery group falls within a charge level range determined based on a charge level of the secondary batteries of the second battery group after charge; and a second adjusting process for charging all the secondary batteries of the first and second battery groups by the same electric quantity respectively.

According to the adjusting method of the invention, in the first adjusting process, the secondary battery(s) of the first battery group is discharged so that the charge level(s) of the first battery group falls within a charge level range determined based on a charge level(s) of the secondary battery(s) of the second battery group. Alternatively, the secondary batteries of the second battery group are charged by the same electric quantity respectively so that the charge level(s) of the first battery group falls within a charge level range determined based on a charge level(s) of the secondary battery or batteries of the second battery group after charging.

Here, the charge level range determined based on the charge level(s) of the secondary battery(s) of the second battery group may include for example a range from a lowest charge level to a highest charge level of the charge level(s) of the second battery group before or after adjustment. It may include a range having a predetermined width higher and lower than an average value (or a center value or a mode value, etc.) of the charge level(s) of the second battery group before or after the adjustment. Further, it may include a range having a predetermined width with a lower limit defined by a minimum value of the charge level(s) of the secondary battery group before or after the adjustment or with an upper limit defined by a maximum value of the same. When the range having the predetermined width is to be set, in a battery pack with controller (a controller-equipped battery pack) including this battery pack, the range is preferably determined as a range equal to or smaller than the maximum difference in the charge level permissible in the secondary batteries constituting the battery pack (i.e. a permissible range of a difference between the minimum charge level and the maximum charge level).

Accordingly, the aforementioned first adjusting process can make adjustment to reduce the difference in charge level between the secondary battery(s) of the first battery group and the secondary battery(s) of the second battery group of the battery pack.

However, when of the secondary battery(s) of the first battery group is discharged or of the secondary battery(s) of the second battery group is charged in the first adjusting process, the difference in battery voltage between the first battery group and the second battery group is increased. This is because when the secondary battery is rapidly discharged or charged, generally, its battery voltage will temporarily largely decrease or increase and then gradually will be recovered.

Accordingly, when the battery pack having just been subjected to only the first adjusting process is used in a controller-equipped battery pack provided with a battery controller for detecting abnormality in characteristic value (a charge level estimated from battery voltage value or the like) based on a battery voltage value by detecting battery voltage of each secondary battery of the battery pack, the characteristic value (the charge level or the like) may be determined to be abnormal due to the large difference in battery voltage. In other words, the battery pack could not be used appropriately even after the charge level is adjusted in the aforementioned first adjusting process.

The battery voltage that has temporally largely decreased or increased due to the rapid discharge or charge will subsequently gradually will be recovered. If the secondary battery(s) of the first battery group is discharged or the secondary battery(s) of the second battery group is charged and they are left stand for several hours or several days, the difference in battery voltage will decrease, thus preventing the above defects. However, this is low in working efficiency. This also could not respond to a demand for prompt use of the battery pack (controller-equipped battery pack) and a vehicle of the like mounted with it.

On the other hand, according to the adjusting method of the invention, both the first battery group and the second battery group, namely, all the secondary batteries constituting the battery pack are discharged or charged by the same electric quantity respectively in the second adjusting process. Thus, the difference in battery voltage between the secondary battery(s) of the first battery group and the secondary battery(s) of the second battery group can be reduced.

This is because the second battery group having not been discharged in the first adjusting process greatly decreases in battery voltage by discharge in the second adjusting process, whereas the first battery group having already been discharged in the first adjusting process will decrease in battery voltage at a lower decreasing rate than the second battery group even if the first battery group is discharged again in the second adjusting process.

On the contrary, this is because the first battery group having not been charged in the first adjusting process greatly increases in battery voltage by charge in the second adjusting process, whereas the second battery group having already charged in the first adjusting process will increase in battery voltage at a lower increasing rate than the first battery group even if the second battery group is charged again in the second adjusting process.

Furthermore, all the secondary batteries of the first and second battery groups are discharged or charged by the same electric quantity respectively in the second adjusting process, which prevents the difference in charge level between the first battery group and the second battery group adjusted in the first adjusting process from increasing in the second adjusting process.

As above, the adjusting method of the invention can reduce the difference in charge level between the secondary battery(s) of the first battery group and the secondary battery(s) of the second battery group in the first adjusting process and reduce the difference in batter voltage between the secondary battery(s) of the first battery group and the secondary battery(s) of the second battery group in the second adjusting process. When the battery pack is then combined with the aforementioned battery controller to form a controller-equipped battery pack, accordingly, the characteristic value (the charge level and the like) based on the battery voltage is not detected to be abnormal, so that the battery pack can be used appropriately. According to the adjusting method of the invention, furthermore, there is no need for leaving the secondary batteries stand for a long period in order to reduce the difference in battery voltage between the secondary batteries. Thus, the adjusting of the battery pack can be completed in a short time.

The charge level of each secondary battery of the battery pack before the adjusting can be grasped by obtaining data on the charge level calculated (estimated) by for example the battery controller of the controller-equipped battery pack installed with this battery pack in use.

The battery(s) of the first battery group may include a (new) secondary battery(s) that has replaced an old one and thus has been used only for a short period of time as compared with another battery(s) (the second battery group), that is, a secondary battery(s) whose charge level has been increased as compared with another battery because of repetition of charge and discharge. Further, the battery(s) of the first battery group may be a secondary battery(s) that is less deteriorated and increased in charge level as compared with another battery(s) because the battery(s) of the first battery group is exposed in use to an ambient temperature lower than that to which another battery(s) (second battery group) is exposed, for example, a secondary battery(s) located closer to either end easy to cool in the battery pack including a plurality of secondary batteries arranged in a row.

If the first battery group includes a plurality of secondary batteries, they may be discharged at once by the same electric quantity or separately (by the same or different electric quantity) in the first adjusting process. Further, some of the secondary batteries of the first battery group may be discharged separately and others may be discharged at once (by the same or different electric quantity).

If the second battery group includes a plurality of secondary batteries, similarly, they may be charged by the same electric quantity at once or separately. Further, some of the secondary batteries of the second battery group may be charged separately and others may be charged at once.

In any one of the battery pack adjusting methods, preferably, the first adjusting process comprises making the charge level of at least one secondary battery of the first battery group equal to the charge level of the secondary battery whose charge level is lowest in the second battery group.

According to another aspect, the invention provides a method of adjusting a battery pack including a plurality of secondary batteries divided into a first battery group and a second battery group according to charge levels before adjustment so that the first battery group includes one or more secondary batteries each having a high charge level and the second battery group includes one or more secondary batteries each having a lower charge level than that of the first battery group, the method being adapted to reduce a difference in charge level between the one or more secondary batteries of the first battery group and the one or more secondary batteries of the second battery group, wherein the method comprises: a first adjusting process for charging the one or more secondary batteries of the second battery group so that the charge level of each secondary battery of the second battery group falls within a charge level range determined based on the charge level of the one or more secondary batteries of the first battery group; and a second adjusting process for charging all the secondary batteries of the first and second battery groups by the same electric quantity respectively.

Alternatively, the invention provides a method of adjusting a battery pack including a plurality of secondary batteries divided into a first battery group and a second battery group according to charge levels before adjustment so that the first battery group includes one or more secondary batteries each having a high charge level and the second battery group includes one or more secondary batteries each having a lower charge level than that of the first battery group, the method being adapted to reduce a difference in charge level between the one or more secondary batteries of the first battery group and the one or more secondary batteries of the second battery group, wherein the method comprises: a first adjusting process for discharging the secondary batteries of the first battery group by the same electric quantity respectively so that the charge level of the one or more secondary batteries of the second battery group falls within a charge level range determined based on a charge level of the secondary batteries of the first battery group after discharge; and a second adjusting process for discharging all the secondary batteries of the first and second battery groups by the same electric quantity respectively.

According to the adjusting method of the invention, the secondary battery(s) of the second battery group is charged in the first adjusting process so that the charge level(s) of the secondary battery(s) falls within the charge level range determined based on the charge level of the one or secondary batteries of the first battery group. Alternatively, the secondary batteries of the first battery group is charged by the same electric quantity so that the charge level(s) of the secondary battery(s) of the second battery group falls within the charge level range determined based on the charge level of the secondary batteries of the first battery group after discharge.

Here, the charge level range determined based on the charge level of the first battery group may include for example a range from a lowest charge level to a highest charge level of the charge level(s) of the first battery group before or after adjustment. It may include a range having a predetermined width higher and lower than an average value (a center value, a mode value, etc.) of the charge level(s) of the first battery group before or after the adjustment. Further, it may include a range having a predetermined width with a lower limit defined by a minimum value of the charge level(s) of the first battery group before or after the adjustment or with an upper limit defined by a maximum value of the same. When the range having the predetermined width is to be set, in a controller-equipped battery pack using this battery pack, the range is preferably determined as a range equal to or smaller than the maximum difference in the charge level permissible in the secondary battery(s) constituting the battery pack (i.e. a permissible range of a difference between the minimum charge level and the maximum charge level).

Accordingly, the first adjusting process of the invention can make adjustment to reduce the difference in charge level between the second battery(s) of the first battery group and the second battery(s) of the second battery group of the battery pack.

However, the second battery group is charged or the first battery group is discharged in the first adjusting process, the difference in battery voltage between the first battery group and the second battery group is rather increased.

On the other hand, according to the adjusting method of the invention, both the first and second battery groups, namely, all the secondary batteries constituting the battery pack are discharged or charged by the same electric quantity respectively in the second adjusting process. Thus, the difference in battery voltage between the secondary battery(s) of the first battery group and the secondary battery(s) of the second battery group can be reduced. In addition, all the secondary batteries of the first battery group and the second battery group are discharged or charged by the same electric quantity respectively in the second adjusting process, which prevents the difference in charge level between the secondary battery(s) of the first battery group and the secondary battery(s) of the second battery group adjusted in the first adjusting process from increasing in the second adjusting process.

As above, the adjusting method of the invention can reduce the difference in charge level between the secondary battery(s) of the first battery group and the secondary battery(s) of the second battery group in the first adjusting process and reduce the difference in battery voltage between the secondary battery(s) of the first battery group and the secondary battery(s) of the second battery group in the second adjusting process. When the battery pack is then combined with the aforementioned battery controller to form a controller-equipped battery pack, accordingly, the characteristic value (the charge level and the like) based on the battery voltage is not detected to be abnormal, so that the battery pack can be used appropriately. According to the adjusting method of the invention, furthermore, there is no need for leaving the secondary batteries stand for a long period in order to reduce the difference in battery voltage among the secondary batteries. Thus, the adjustment of the battery pack can be completed in a short time.

If the second battery group includes a plurality of secondary batteries, they may be charged at once by the same electric quantity or separately (by the same or different electric quantity) in the first adjusting process. Alternatively, some of secondary batteries of the second battery group may be charged separately and others may be charged at once (by the same or different electric quantity).

If the first battery group includes a plurality of secondary batteries, similarly, they may be discharged by the same electric quantity at once or separately. Further, some of the secondary batteries of the first battery group may be discharged separately and others may be discharged at once.

In any one of the battery pack adjusting methods, preferably, the first adjusting process includes making the charge level of at least one secondary battery of the second battery group equal to the charge level of the secondary battery whose charge level is highest in the first battery group.

Moreover, preferably, the invention provides a method of adjusting a battery pack including a plurality of secondary batteries divided into a first battery group and a second battery group according to charge levels before adjustment so that the first battery group has a high charge level and the second battery group has a lower charge level than that of the first battery group, the method being adapted to reduce a difference in charge level between the first battery group and the second battery group, wherein the method comprises: an adjusting process of the second battery group, for discharging the secondary batteries of the second battery group by the same electric quantity: and an adjusting process of the first battery group, for discharging the secondary battery of the first battery group so that the charge level of the first battery group falls within a charge level range determined based on the charge level of the second battery group that has already been or will be discharged in the second battery group adjusting process.

This adjusting method includes the second battery group adjusting process for discharging the secondary batteries of the second battery group by the same electric quantity and the first battery group adjusting process for charging the secondary battery(s) of the first battery group so that the charge level of the first battery group falls within the charge level range determined based on the charge level of the second battery group that has already been or will be discharged in the second battery group adjusting process. In this way, both the first and second battery groups (all the secondary batteries constituting the battery pack) are discharged so that the charge level of the first battery group falls within the predetermined charge level range, so that the difference in charge level between the secondary battery(s) of the first battery group and the secondary battery(s) of the second battery group can be reduced and also an increase in the battery voltage difference between the secondary battery(s) of the first battery group and the secondary battery(s) of the second battery group due to the adjustment of charge level can be restrained.

The first battery group adjusting process and the second battery group adjusting process may be conducted in this order or in reverse order and may be performed simultaneously but independently.

If the first battery group adjusting process is performed prior to or at the same time with the second battery group adjusting process, however, it is preferable to set a discharge electric quantity (a target charge level) of the secondary battery(s) of the first battery group in consideration of a discharge electric quantity of the secondary battery(s) of the second battery group to be achieved in the second battery group adjusting process.

Furthermore, preferably, the invention provides a method of adjusting a battery pack including a plurality of secondary batteries divided into a first battery group and a second battery group according to charge levels before adjustment so that the first battery group has a high charge level and the second battery group has a lower charge level than that of the first battery group, the method being adapted to reduce a difference in charge level between the first battery group and the second battery group, wherein the method comprises: an adjusting process of the second battery group, for charging the secondary batteries of the second battery group by the same electric quantity; and an adjusting process of the first battery group, for charging the secondary battery of the first battery group so that the charge level of the first battery group falls within a charge level range determined based on the charge level of the second battery group that has already been or will be charged in the second battery group adjusting process.

This adjusting method includes the second battery group adjusting process for charging the secondary batteries of the second battery group by the same electric quantity and the first battery group adjusting process for charging the secondary battery(s) of the first battery group so that the charge level of the first battery group falls within the charge level range determined based on the charge level of the second battery group that has already been or will be charged in the second battery group adjusting process. In this way, both the first and second battery groups (all the secondary batteries constituting the battery pack) are charged so that the charge level of the first battery group falls within the predetermined charge level range, so that the difference in charge level between the first battery group and the second battery group can be reduced and also an increase in difference in battery voltage between the first battery group and the second battery group due to the adjustment of charge level can be restrained.

The first battery group adjusting process and the second battery group adjusting process may be conducted in this order or in reverse order and may be performed simultaneously but independently.

If the first battery group adjusting process is performed prior to or at the same time with the second battery group adjusting process, however, it is preferable to set a charge electric quantity (a target charge level) of the secondary battery(s) of the first battery group in consideration of a charge electric quantity of the second battery group to be achieved in the second battery group adjusting process.

In any one of the aforementioned battery pack adjusting methods, preferably, the first battery group adjusting process includes making the charge level of at least one of the secondary batteries of the first battery group equal to the charge level of the secondary battery whose charge level is lowest in the second battery group that has already been or will be discharged or charged in the second battery group adjusting process.

Furthermore, preferably, the invention provides a method of adjusting a battery pack including a plurality of secondary batteries divided into a first battery group and a second battery group according to charge levels before adjustment so that the first battery group has a high charge level and the second battery group has a lower charge level than that of the first battery group, the method being adapted to reduce a difference in charge level between the first battery group and the second battery group, wherein the method comprises: an adjusting process of the first battery group, for discharging the secondary batteries of the first battery group by the same electric quantity; and an adjusting process of the second battery group, for discharging the secondary battery of the second battery group so that the charge level of the second battery group falls within a charge level range determined based on the charge level of the first battery group that has already been or will be discharged in the first battery group adjusting process.

The first battery group adjusting process and the second battery group adjusting process may be conducted in this order or in reverse order and may be performed simultaneously but independently.

If the second battery group adjusting process is performed prior to or at the same time with the first battery group adjusting process, however, it is preferable to set a discharge electric quantity (a target charge level) of the secondary battery(s) of the second battery group in consideration of a discharge electric quantity of the first battery group to be achieved in the first battery group adjusting process.

Furthermore, preferably, the invention provides a method of adjusting a battery pack including a plurality of secondary batteries divided into a first battery group and a second battery group according to charge levels before adjustment so that the first battery group has a high charge level and the second battery group has a lower charge level than that of the first battery group, the method being adapted to reduce a difference in charge level between the first battery group and the second battery group, wherein the method comprises: an adjusting process of the first battery group, for charging the secondary batteries of the first battery group by the same electric quantity; and an adjusting process of the second battery group, for charging the secondary battery of the second battery group so that the charge level of the second battery group falls within a charge level range determined based on the charge level of the first battery group that has already been or will be charged in the first battery group adjusting process.

The first battery group adjusting process and the second battery group adjusting process may be conducted in this order or in reverse order and may be performed simultaneously but independently.

If the second battery group adjusting process is performed prior to or at the same time with the first battery group adjusting process, however, it is preferable to set a charge electric quantity (a target charge level) of the secondary battery(s) of the second battery group in consideration of a charge electric quantity of the first battery group to be achieved in the first battery group adjusting process.

In any one of the aforementioned battery pack adjusting methods, preferably, the second battery group adjusting process includes making the charge level of at least one of the secondary batteries of the second battery group equal to the charge level of the secondary battery whose charge level is highest in the first battery group that has already been or will be discharged or charged in the first battery group adjusting process.

According to another aspect, furthermore, the invention provides a method of adjusting a battery pack with controller, the battery pack with controller comprising a battery pack including a plurality of secondary batteries electrically connected, and a battery controller adapted to estimate each charge level of the secondary batteries based on each battery voltage and detect abnormality in the secondary batteries based on each estimated charge level, wherein the method comprises: assuming each charge level of the secondary batteries estimated by the battery controller to be a charge level before adjustment and dividing the secondary batteries into the first battery group and the second battery group; and reducing a difference in charge level between the secondary battery of the first battery group and the secondary battery of the second battery group according to the adjusting method set forth in any one of the above adjusting methods.

According to the adjusting method of a battery pack with controller (a controller-equipped battery pack) of the invention, the charge level of each of the plurality of secondary batteries constituting the battery pack is estimated by the battery controller and assumed as a charge level before adjustment, and the secondary batteries of battery pack are divided into the first battery group and the second battery group. By any one of the aforementioned adjusting methods, the difference in charge level between the secondary battery(s) of the first battery group and the secondary battery(s) of the second battery group constituting the battery pack is reduced. In other words, any of the aforementioned first and second adjusting processes are conducted or any of the aforementioned first and second battery group adjusting processes are conducted. This makes it possible to reduce the difference in charge level between the secondary battery(s) of the first battery group and the secondary battery(s) of the second battery group and also restrain an increase in difference in battery voltage between the secondary battery(s) of the first battery group and the secondary battery(s) of the second battery group due to the adjustment of charge level. Consequently, even when the controller-equipped battery pack is used just after the adjustment, the charge levels of the secondary batteries estimated by the battery controller will not largely differ from one another. Thus, the charge level is not detected to be abnormal and the controller-equipped battery pack can be used appropriately.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 3 is a graph showing battery voltages of secondary batteries (first and second battery groups) before adjustment in the first embodiment;

FIG. 4 is a graph showing estimated charge levels of the secondary batteries (first and second battery groups) before adjustment in the first embodiment;

FIG. 5 is a flowchart showing the flow of the adjusting process of the battery pack in the first embodiment;

FIG. 9 is a graph showing a charge level of the secondary batteries (first and second battery groups) after a second adjusting process in the first embodiment;

FIG. 10 is a graph showing battery voltage of the secondary batteries (first and second battery groups) after the second adjusting process in the first embodiment;

FIG. 11 is a graph showing estimated charge levels of the secondary batteries (first and second battery groups) after the second adjusting process in the first embodiment;

FIG. 12 is a flowchart showing the flow of an adjusting process of a battery pack in a second embodiment;

FIG. 19 is a flowchart showing the flow of an adjusting process of a battery pack in a third embodiment;

FIG. 20 is a graph showing charge levels of secondary batteries (first and second battery groups) after the adjusting process of the second battery group in the third embodiment;

FIG. 21 is a graph showing battery voltages of the secondary batteries (first and second battery groups) after the adjusting process of the second battery group in the third embodiment;

DETAILED DESCRIPTION OF THE PREFERRED EMBODIMENTS

Embodiment 1

A detailed description of a first preferred embodiment of the present invention will now be given referring to the accompanying drawings.

Figure 1:
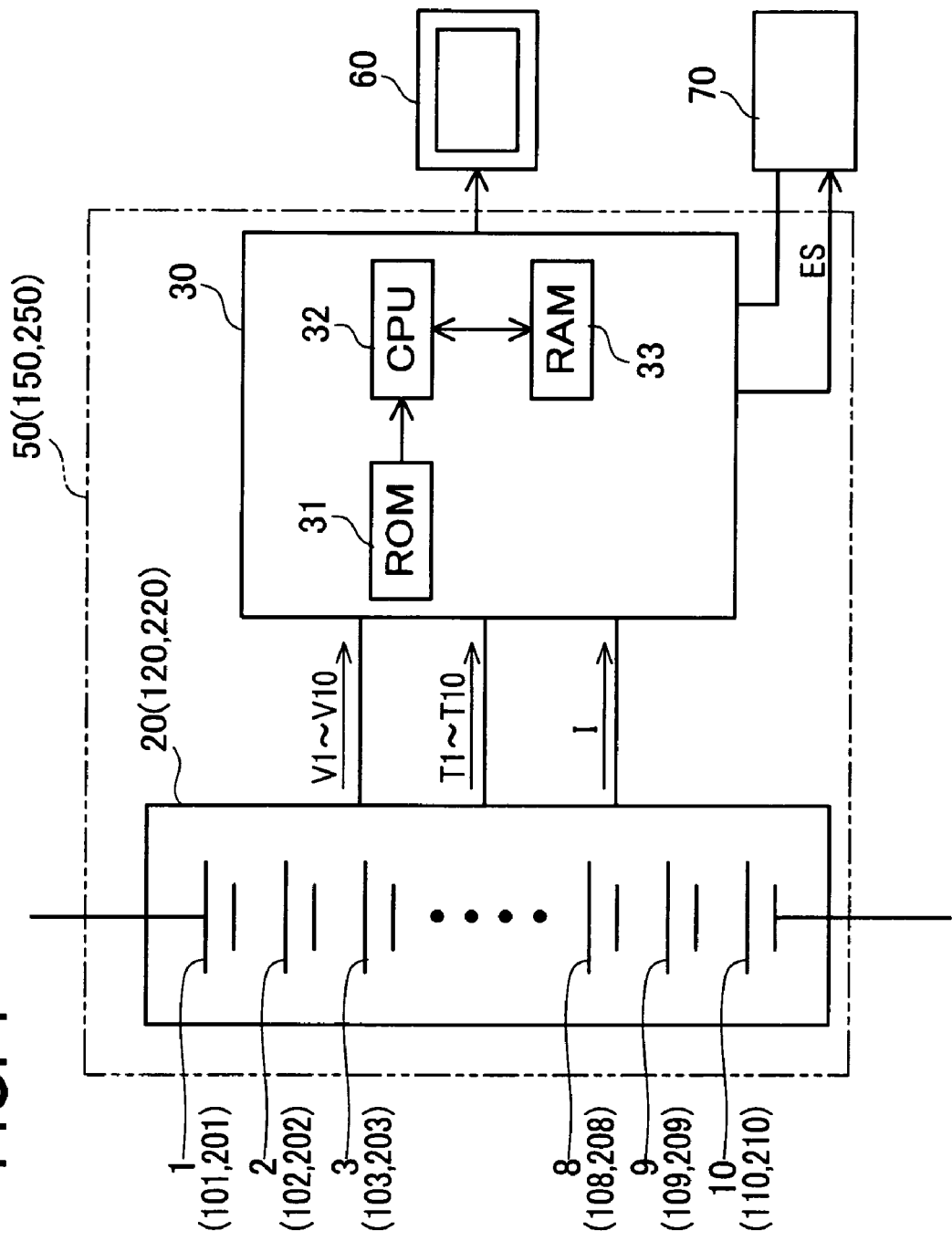
FIG. 1 is a block diagram of a controller-equipped battery pack in first to fifth embodiments.

A battery pack 50 equipped with a controller (hereinafter, "a controller-equipped battery pack 50") in the first embodiment will be first explained below. This controller-equipped battery pack 50 is constituted by a battery pack 20 and a battery controller 30 as shown in FIG. 1. The battery pack 20 includes ten secondary batteries (the secondary batteries 1 to 10, see FIG. 2) which are electrically connected in series by a connection member not shown. Each secondary battery 1 to 10 forms a battery module in which six cells are connected in series.

The battery controller 30 is a well known battery controller (see JP2006-79961A, for example) including a ROM 31, a CPU 32, a RAM 33, and others. This battery controller 30 is adapted to detect battery voltages V1 to V10, battery temperatures T1 to T10, and current values I of the secondary batteries 1 to 10 of the battery pack 20, etc. In the first embodiment, the secondary batteries 1 to 10 are connected in series and hence equal currents flow through the secondary batteries respectively. The battery controller 30 estimates a charge level (a charged electric quantity) of each secondary battery 1 to 10 based on those values, and detects whether each charge level is abnormal based on each "estimated charge level". Specifically, for example, when a maximum difference between a lowest charge level and a highest charge level of the estimated charge levels of the secondary batteries 1 to 10 exceeds a permissible range (e.g. 0.2 Ah), it is determined to be abnormal in charge level.

Data on the estimated charge levels of the secondary batteries 1 to 10 estimated by the battery controller 30 can be grasped from outside in such a way that a well known data monitor 60 is used to obtain such data from the battery controller 30 as shown in FIG. 1.

The controller-equipped battery pack 50 in the first embodiment is mounted on for example an electric vehicle, a hybrid electric vehicle, and the like to be used as a power source thereof.

The first embodiment shows an example that only the secondary battery 8 of the secondary batteries 1 to 10 constituting the battery pack 20 is newer than other batteries and hence is less deteriorated. In such battery pack 20, as it is repeatedly charged or discharged in use, the charge level of the secondary battery 8 becomes too higher than the charge levels of other secondary batteries as shown in FIG. 4 and thus the charge level of the secondary battery 8 may be determined to be abnormal.

FIG. 4 is a graph showing estimated charge levels of the secondary batteries 1 to 10 estimated by the battery controller 30 based on the battery voltages V1 to V10 of the secondary batteries 1 to 10. FIG. 3 is a graph showing the battery voltages V1 to V10 of the secondary batteries 1 to 10 detected by the battery controller 30. The numerals 1 to 10 indicated along a lateral axis of each graph in FIGS. 3 and 4 represent the secondary batteries 1 to 10 respectively.

The battery controller 30 calculates a difference (maximum difference) $\Delta Q$ between a maximum estimated charge level Qmax (the charge level of the secondary battery 8 in the first embodiment) and a minimum estimated charge level Qmin (the charge levels of the secondary batteries 5 and 6 in the first embodiment) of the estimated charge levels Q of the secondary batteries 1 to 10. If the maximum difference $\Delta Q$ exceeds the permissible range, it is determined that the charge level of the battery pack is abnormal. As shown in FIG. 1, an abnormality signal ES is then transmitted to a controller unit 70 which executes various controls for a hybrid electric vehicle or the like. In response to this signal, the controller unit 70 generates a warning or the like to a driver or the like.

When the charge level is determined to be abnormal as above, the charge level is adjusted as follows in the first embodiment. FIG. 5 is a flowchart showing the flow of an adjusting process of the battery pack 20 in the first embodiment.

At step S1, firstly, using the data monitor 60, the estimated charge levels Q (see FIG. 4) of the secondary batteries 1 to 10 constituting the battery pack 20 are obtained from the battery controller 30 as shown in FIG. 1. At step S2, the secondary batteries 1 to 10 are divided into a first battery group A and a second battery group B according to the degrees of the obtained estimated charge levels Q of the secondary batteries 1 to 10. In the first embodiment, the secondary battery 8 with a relatively high charge level is assumed as the first battery group A and other batteries 1 to 7, 9, and 10 with lower charge levels than that of the secondary battery 8 are assumed as the second battery group B.

(First Adjusting Step)

Figure 6:
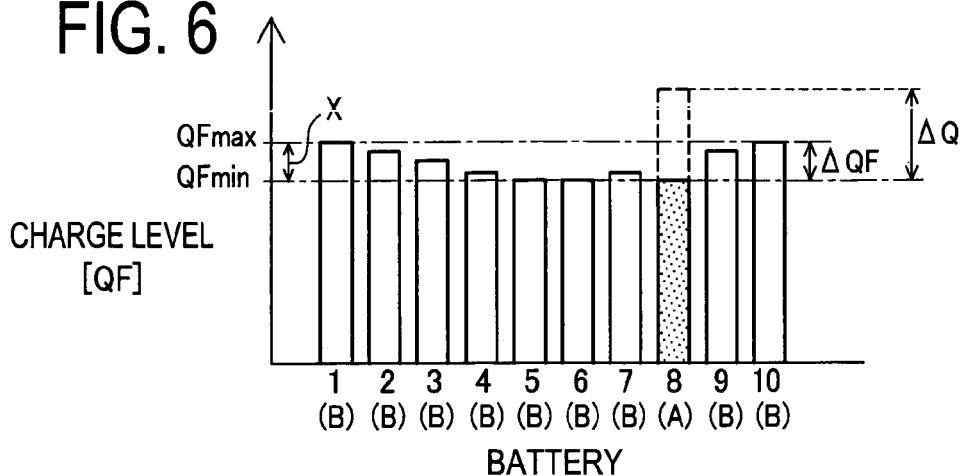
FIG. 6 is a graph showing charge levels of the secondary batteries (first and second battery groups) after a first adjusting process in the first embodiment.

At step S3 (see FIG. 5), the first battery group A (the secondary battery 8) is discharged so that the charge level of the first battery group A falls within a charge level range X determined based on the charge levels of the second battery group B (the secondary batteries 1 to 7, 9, 10). In the first embodiment, the charge level range X is defined as a range from a lowest charge level to a highest charge level of the charge levels of the second battery group B (see FIG. 6). In the first embodiment, as shown in FIG. 6, the first battery group A (the secondary battery 8) is discharged by ΔQ so that the charge level of the first battery group A after a first adjusting process is equal to a charge level QFmin (=Qmin) of the secondary batteries 5 and 6 whose charge levels are lowest in the second battery group B. The charge level range X is set to meet the permissible range (e.g., 0.2 Ah) of the charge level permissible in the battery controller 30.

Figure 2:
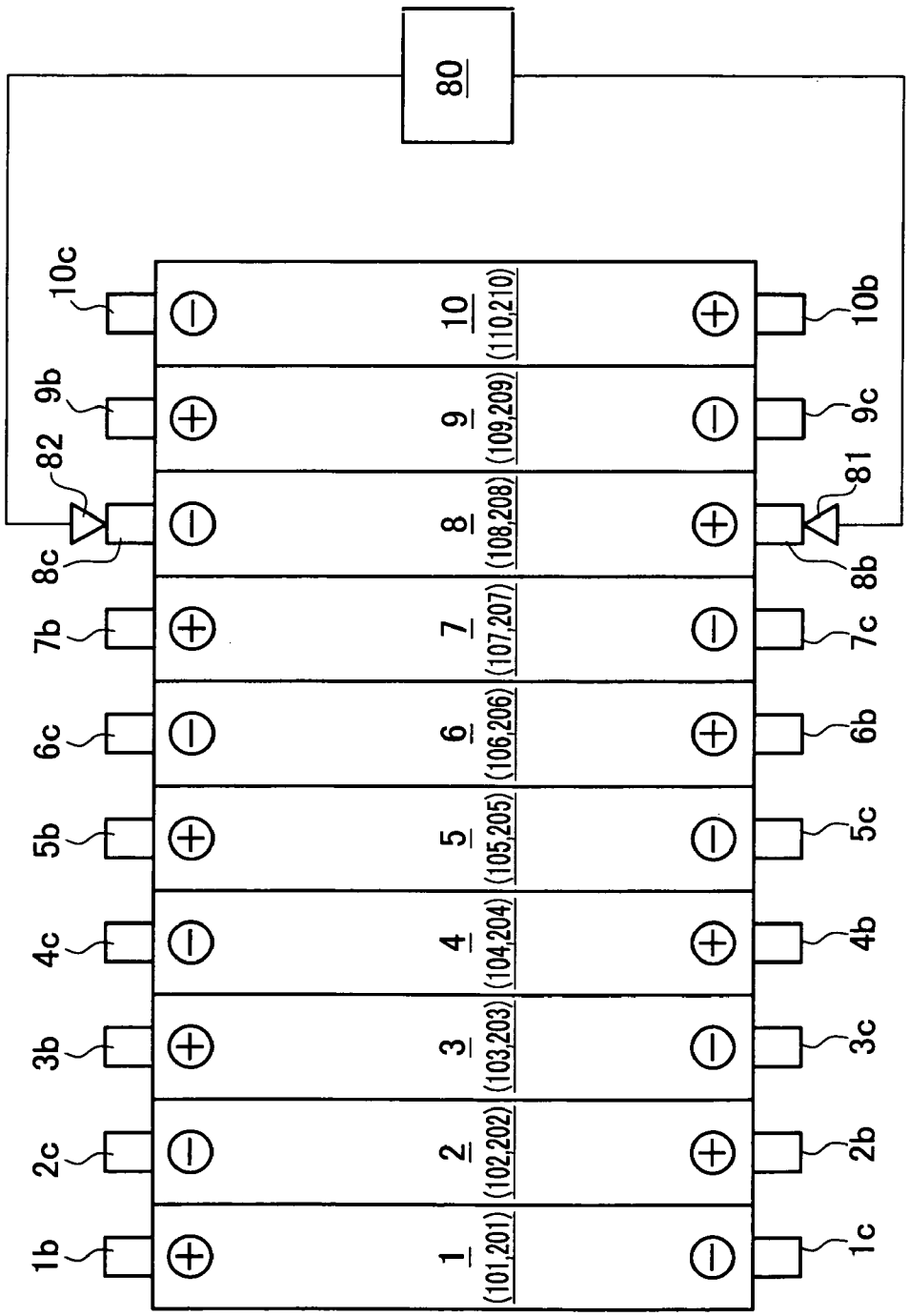
FIG. 2 is an explanatory view showing an adjusting process of the battery pack in the first to fifth embodiments.

To be concrete, as shown in FIG. 2, a well known constant current charge and discharge device 80 is disposed by connecting its first terminal 81 to a positive terminal 8b of the secondary battery 8 of the first battery group A and its second terminal 82 to a negative terminal 8c of the secondary battery 8 of the first battery group A. In this state, constant current discharge was carried out. As mentioned above, the discharge level is determined to be ΔQ (see FIG. 6) obtained by subtracting the charge level Qmin of the secondary batteries 5 and 6 which are the lowest charge level of the second battery group B from the charge level Qmax of the first battery group A before the first adjusting process. Regarding the secondary batteries 1 to 10 after the first adjusting process, consequently, the maximum difference ΔQF in the charge level QF can be made equal to the maximum charge level difference among the secondary batteries of the second battery group B before the first adjusting process and decreased than ΔQ before the first adjusting process. That is, the charge level difference between the first battery group A (the secondary battery 8) and the second battery group B (the secondary batteries 1 to 7, 9, 10) can be reduced.

Figure 7:
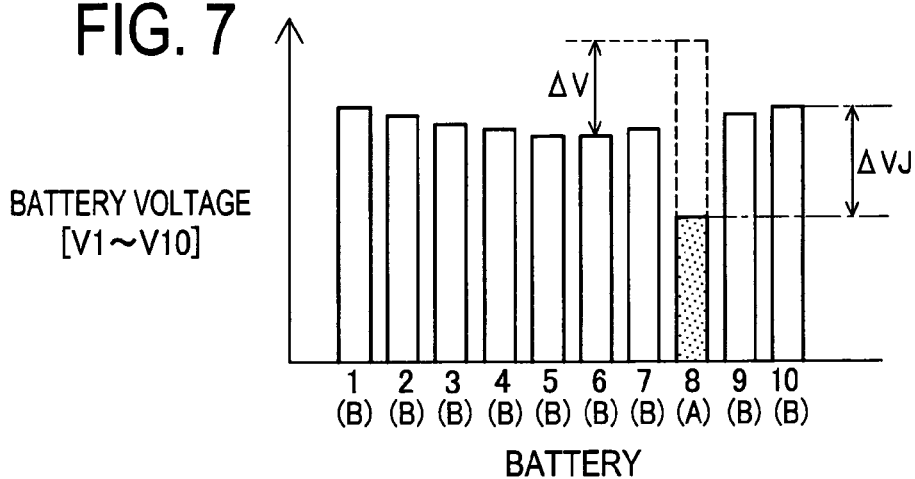
FIG. 7 is a graph showing battery voltages of the secondary batteries (first and second battery groups) after the first adjusting process in the first embodiment.

If only the first battery group A (the secondary battery 8) is discharged in the aforementioned first adjusting process, however, the battery voltage V8 of the first battery group A (the secondary battery 8) temporarily decreases largely. As shown in FIG. 7, therefore, a maximum battery voltage difference ΔVJ among the secondary batteries 1 to 10 after the first adjusting process (i.e., a battery voltage difference between the secondary battery 8 of the first battery group A and the secondary batteries 1 and 10 with highest battery voltages in the second battery group B) would possibly increase than a maximum battery voltage difference ΔV before the first adjusting process.

If the controller-equipped battery pack 50 including the battery pack 20 having been subjected to the first adjusting process is mounted and used in the hybrid electric vehicle or the like, the battery controller 30 calculates an estimated charge level QJ based on the battery voltages V1 to V10 (see FIG. 7). Accordingly, the battery controller 30 is likely to estimate that the estimated charge level QJ of the first battery group A (the secondary battery 8) after the first adjusting process is a value QJmin which is extremely smaller than the charge level QFmin of the first battery group A (the secondary battery 8).

Consequently, regarding the estimated charge levels QJ of the secondary batteries 1 to 10 after the first adjusting process, the battery controller 30 will calculate the difference (the maximum difference) ΔQJ between the maximum estimated charge level QJmax (the charge levels of the secondary batteries 1 and 10) and the minimum estimated charge level QJmin (the charge level of the secondary battery 8) and judge this maximum difference ΔQJ as exceeding the permissible range and come to a conclusion that the charge level of the battery pack is abnormal. Thus, even though the maximum difference ΔQF (see FIG. 6) among the charge levels of the secondary batteries 1 to 10 is adjusted to fall within the permissible range (e.g. within 0.2 Ah) of the battery controller 30 in the first adjusting process, the controller-equipped battery pack 50 could not be used appropriately.

In this regard, if the first battery group A (the secondary battery 8) is discharged in the first adjusting process and then is left to stand for a long time (e.g. several days), the battery voltage V8 of the first battery group A (the secondary battery 8) that has temporarily decreased will be recovered. When the controller-equipped battery pack 50 is thereafter mounted and used in a hybrid electric vehicle or the like for example, the battery controller 30 will not determine that the charge level is abnormal, under the influence of temporary decrease of battery voltage. This is however low in working efficiency and could not respond to a demand for promptest use of the controller-equipped battery pack 50.

In the first embodiment, therefore, a second adjusting process mentioned later is conducted following the first adjusting process to enable the prompt use of the controller-equipped battery pack 50.

(Second Adjusting Process)

Specifically, at step S4 (see FIG. 5) following step S3, both of the first battery group A and the second battery group B (i.e. all of the secondary batteries 1 to 10 constituting the battery pack 20) are discharged by the same electric quantity ΔQH as shown in FIG. 9. To be concrete, for example, the secondary batteries 1 to 10 connected in series with one another are discharged at once by use of the constant current charge and discharge device 80.

As a result, the charge level of the secondary batteries 1 to 10 are decreased by ΔQH respectively, whereas the maximum difference ΔQG (a charge level difference between the maximum charge level QGmax and the minimum charge level QGmin) in the charge level QG among the secondary batteries 1 to 10 after the second adjusting process remains unchanged from the maximum difference ΔQF in the charge level QF before the second adjusting process (see FIG. 9).

On the other hand, as shown in FIG. 10, the maximum battery voltage difference among the secondary batteries 1 to 10 after the second adjusting process can be reduced from ΔVJ to ΔVK. This is because the battery voltage (V1 to V7, V9, V10) of the second battery group B (the secondary batteries 1 to 7, 9, 10) greatly decreases by discharge in the second adjusting process, whereas the battery voltage of the first battery group A (the secondary battery 8) having been already discharged in the first adjusting process will decrease at a lower decreasing rate as compared with the second battery group B (the secondary batteries 1 to 7, 9, 10) even if the first battery group A is discharged again in the second adjusting process.

Consequently, when the controller-equipped battery pack 50 including the battery pack 20 having been subjected to the first and second adjusting processes is mounted and used in the hybrid electric vehicle or the like, the battery controller 30 calculates the estimated charge levels QK of the secondary batteries 1 to 10 (see FIG. 11) based on the battery voltages V1 to V10 with a maximum battery voltage difference reduced to ΔVK (see FIG. 10).

Figure 8:
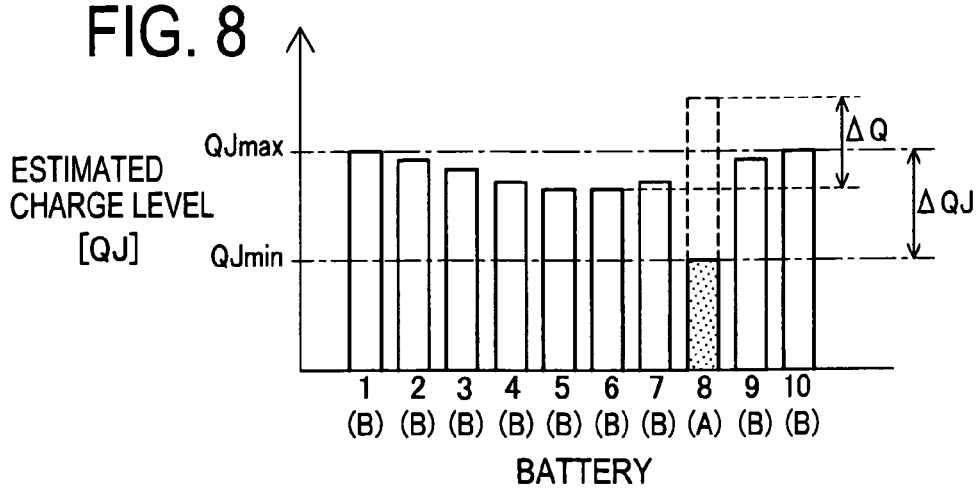
FIG. 8 is a graph showing estimated charge levels of the secondary batteries (first and second battery groups) after the first adjusting process in the first embodiment.

Regarding this estimated charge level QK, the maximum difference ΔQK between the maximum estimated charge level QKmax (the estimated charge levels of the secondary batteries 1 and 10) and the minimum estimated charge level QKmin (the estimated charge level of the secondary battery 8) can be reduced as compared with the maximum difference ΔQJ (see FIG. 8) in the estimated charge level QJ before the second adjusting process. Further, the maximum difference ΔQK can be reduced than the maximum difference ΔQ (see FIG. 4) in the estimated charge level Q before the adjustment and hence fall within the permissible range (e.g. 0.2 Ah) in the battery controller 30.

The controller-equipped battery pack 50 including the battery pack 20 having been subjected to the second adjusting process can be used appropriately.

According to the adjusting method in the first embodiment, additionally, the battery voltage difference ΔVJ among the secondary batteries 1 to 10 after the first adjusting process is reduced. Thus, the secondary batteries 1 to 10 do not have to be left stand for a long time. The adjustment of the battery pack 20 can be therefore completed in a short time.

Meanwhile, because of a difference in characteristic from the second battery group B (the secondary batteries 1 to 7, 9, 10), the first battery group A (the secondary battery 8) is apt to gradually increase the charge level as compared with the second battery group B during subsequent use (charge and discharge) even if the charge level is adjusted in the above manner. Thus, the charge level of the first battery group A may become higher than that of the second battery group B again.

In the adjusting method in the first embodiment, therefore, in the first adjusting process, the charge level of the first battery group A (the secondary battery 8) is adjusted to be equal to the charge level QFmin of the secondary batteries 5 and 6 whose charge level are lowest in the second battery group B (the secondary batteries 1 to 7, 9, 10) (see FIG. 6). In this way, it is possible to delay the time until the charge level of the first battery group A (the secondary battery 8) increases than that of the second battery group B (the secondary batteries 1 to 7, 9, 10) during the subsequent use (charge and discharge), that is, until the estimated charge level Q is returned to the condition shown in FIG. 4 again. Accordingly, the battery pack 20 can be used properly over a longer period.

Embodiment 2

A second embodiment of the invention will be explained below. The second embodiment differs in only the adjusting method of the battery pack and is identical in other configurations to those in the first embodiment. Accordingly, the following explanation will be made with a focus on the differences from the first embodiment and the explanation of other configurations will not be omitted or will be simplified.

FIG. 12 is a flowchart showing the flow of the adjusting process of the battery pack in the second embodiment.

At step S1, firstly, the estimated charge levels (see FIG. 4) of the secondary batteries 1 to 10 constituting the battery pack 20 are obtained respectively as in the first embodiment. At step S2, the secondary batteries 1 to 10 are divided into a first battery group A and a second battery group B according to the degrees of the obtained estimated charge levels Q of the secondary batteries 1 to 10. In the second embodiment, similarly, the secondary battery 8 is assumed as the first battery group A and the secondary batteries 1 to 7, 9, 10 are assumed as the second battery group B.

(Control Process of First Battery Group)

Figure 13:
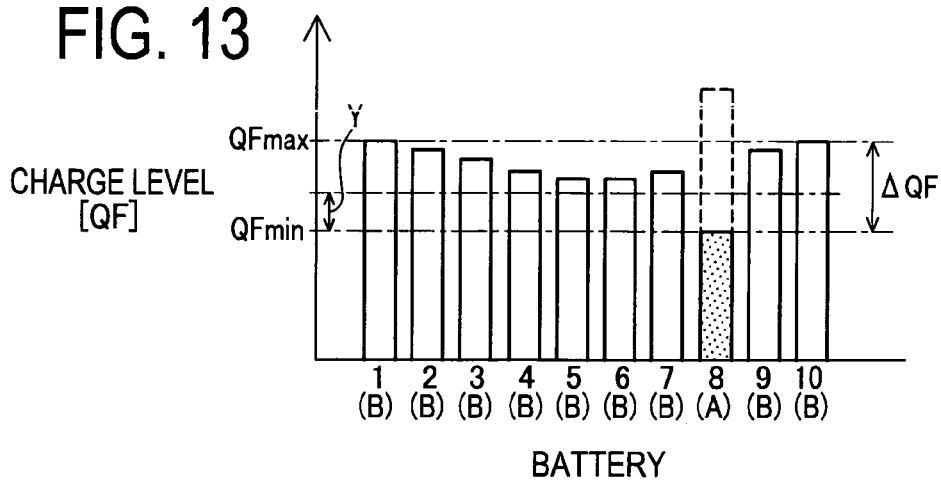
FIG. 13 is a graph showing charge levels of secondary batteries (first and second battery groups) after an adjusting process of a first battery group in the second embodiment.
Figure 16:
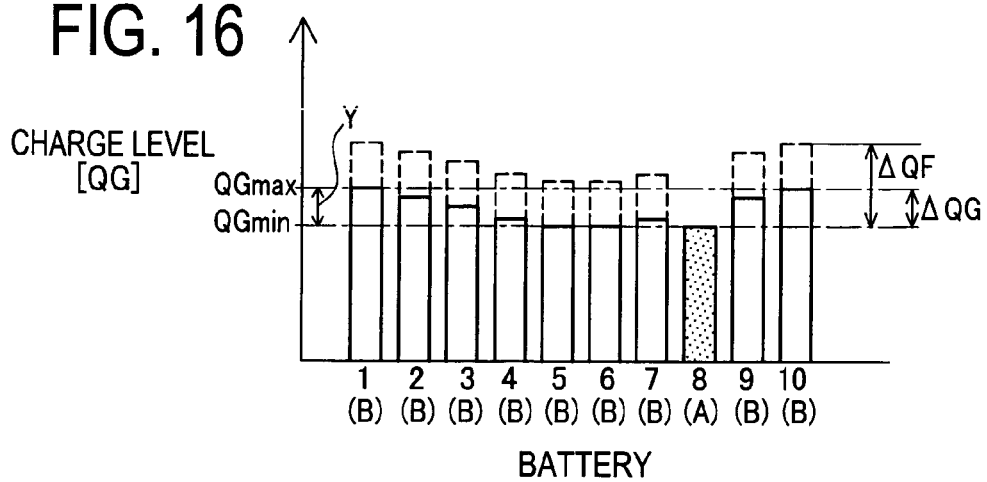
FIG. 16 is a graph showing charge levels of the secondary batteries (first and second battery groups) after an adjusting process of the second battery group in the second embodiment.

At step T3 (see FIG. 12), the first battery group A (the secondary battery 8) is discharged so that the charge level of the first battery group A falls within a charge level range Y determined based on the charge levels of the second battery group B (the secondary batteries 1 to 7, 9, 10) after discharge in the later second adjusting process. The charge level range Y is defined as a range from a lowest charge level to a highest charge level of the charge levels of the second battery group B after discharge. In the second embodiment, the discharge electric quantity of the first battery group A is set so that the charge level thereof is equal to the charge level QGmin (see FIG. 16) of the secondary batteries 5 and 6 whose charge levels are lowest among charge levels QG of the second battery group B (the secondary batteries 1 to 7, 9, 10) after the adjusting process of the second battery group, and the first battery group A is discharged until the charge level thereof reaches QFmin (=QGmin) as shown in FIG. 13.

The charge level range Y is set to meet the permissible range (e.g., 0.2 Ah) of the charge level permissible in the battery controller 30.

Figure 14:
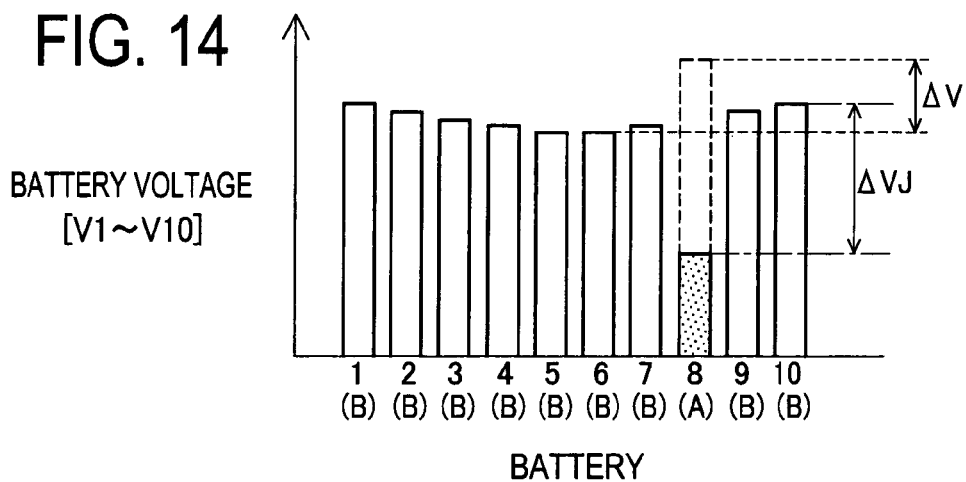
FIG. 14 is a graph showing battery voltages of the secondary batteries (first and second battery groups) after the adjusting process of the first battery group in the second embodiment.
Figure 15:
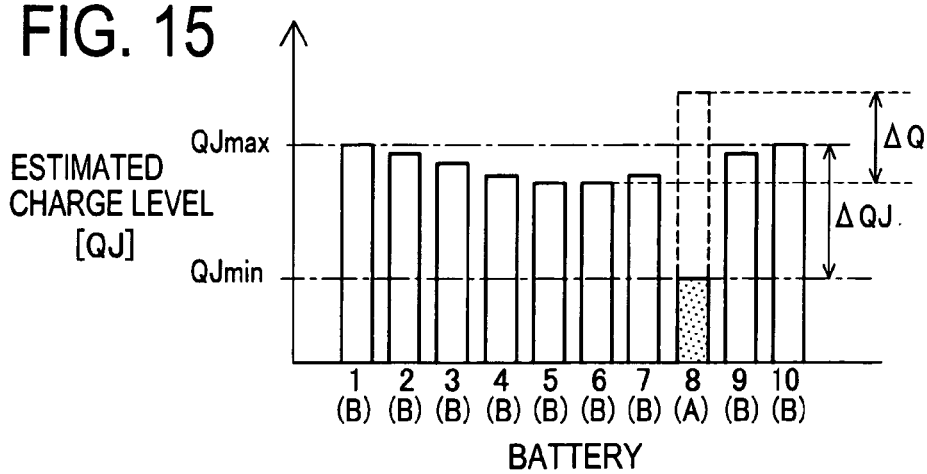
FIG. 15 is a graph showing estimated charge levels of the secondary batteries (first and second battery groups) after the adjusting process of the first battery group in the second embodiment.

At that time, there may be a case where the battery voltage of the first battery group A (the secondary battery 8) greatly decreases, so that the maximum battery voltage difference ΔVJ between the first battery group A and the second battery group B increases than the maximum battery voltage difference ΔV before the adjusting process of the first battery group as shown in FIG. 14. If the controller-equipped battery pack 50 including the battery pack 20 having been subjected to only the first battery group adjusting process is mounted and used in a hybrid electric vehicle or the like, the battery controller 30 is likely to determine that the charge level is abnormal by regarding the maximum difference ΔQJ (see FIG. 15) in the estimated charge level QJ as exceeding the permissible range. In this condition, therefore, the controller-equipped battery pack 50 could not be used appropriately. However, by performing the second battery group adjusting process mentioned later following the first battery group adjusting process, the use of the controller-equipped battery pack 50 is promptly enabled.

(Control Process of Second Battery Group)

Specifically, at step T4 (see FIG. 12) following step T3, the secondary batteries 1 to 7, 9, 10 of the second battery group B are discharged by the same electric quantity to make the charge levels of the secondary batteries 5 and 6 whose charge levels are lowest in the second battery group B (the secondary batteries 1 to 7, 9, 10) equal to the charge level of the first battery group A (the secondary battery 8). This makes it possible to reduce the maximum charge level QGmax after the second battery group adjusting process than the maximum charge level QFmax before the second battery group adjusting process without changing the minimum charge level QGmin after the second battery group adjusting process from the minimum charge level QFmin before the second battery group adjusting process. It is accordingly possible to reduce the maximum difference ΔQG (a difference between the maximum charge level QGmax and a minimum charge level QGmin) in the charge level QG after the second battery group adjusting process than the maximum difference ΔQF in the charge level QF before the second battery group adjusting process. In other words, the charge level difference between the first battery group A (the secondary battery 8) and the second battery group B (the secondary batteries 1 to 7, 9, 10) can be reduced.

Figure 17:
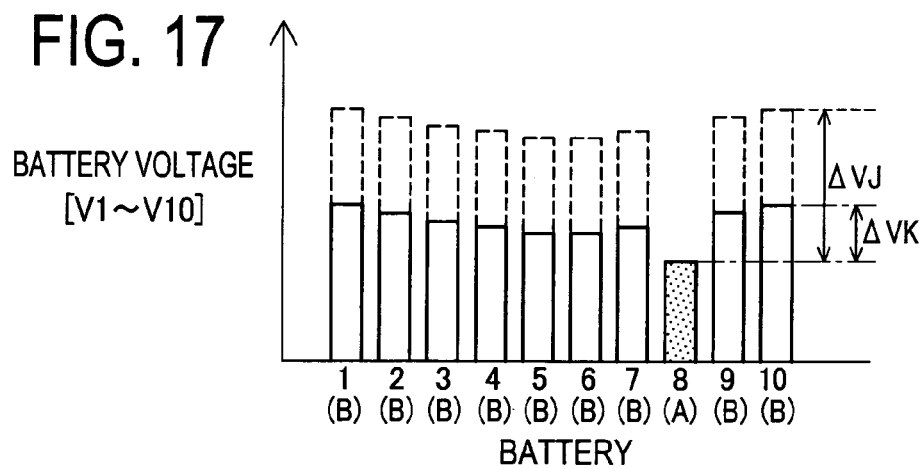
FIG. 17 is a graph showing battery voltages of the secondary batteries (first and second battery groups) after the adjusting process of the second battery group in the second embodiment.

At that time, the battery voltage of the first battery group A (the secondary battery 8) remains unchanged, whereas the battery voltage of the second battery group B (the secondary batteries 1 to 7, 9, 10) greatly decreases. Accordingly, the maximum battery voltage difference ΔVK among the secondary batteries 1 to 10 can be largely reduced from the maximum battery voltage difference ΔVJ before the second battery group adjusting process as shown in FIG. 17.

If the controller-equipped battery pack 50 including the battery pack 20 having been subjected to the first and second battery group adjusting processes is mounted and used in the hybrid electric vehicle or the like, the battery controller 30 calculates an estimated charge level QK of the secondary batteries 1 to 10 (see FIG. 18) based on those battery voltages V1 to V10 (see FIG. 17) with the maximum battery voltage difference reduced to ΔVK.

Figure 18:
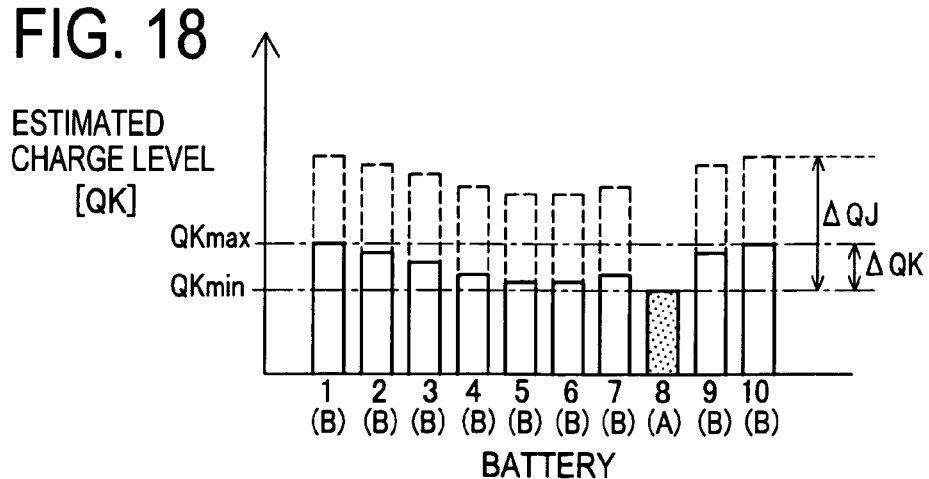
FIG. 18 is a graph showing estimated charge levels of the secondary batteries (first and second battery groups) after the adjusting process of the second battery group in the second embodiment.
Figure 22:
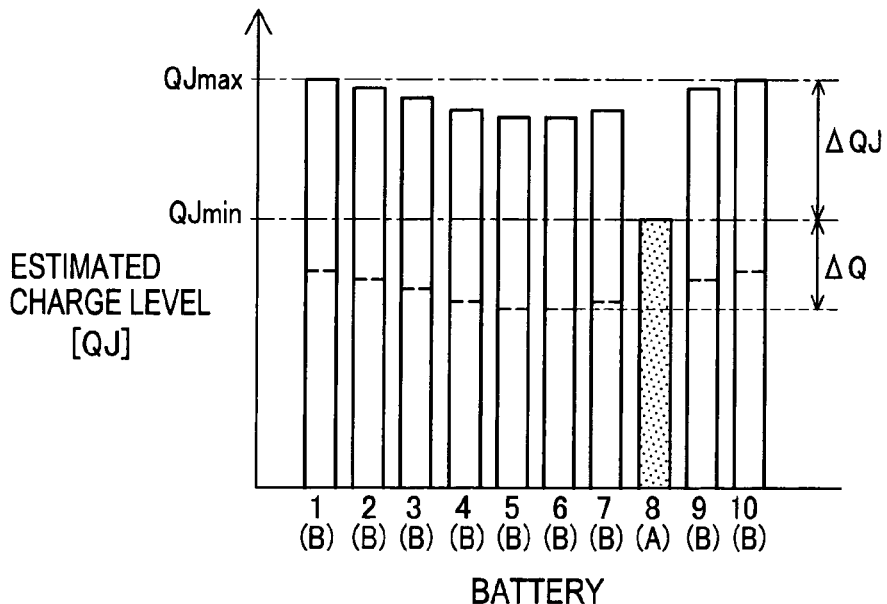
FIG. 22 is a graph showing estimated charge levels of the secondary batteries (first and second battery groups) after the adjusting process of the second battery group in the third embodiment.

Regarding this estimated charge level QK, as shown in FIG. 18, the maximum difference ΔQK between the maximum estimated charge level QKmax (the estimated charge levels of the secondary batteries 1 and 10) and the minimum estimated charge level QKmin (the estimated charge level of the secondary battery 8) can be reduced as compared with the maximum difference ΔQJ in the estimated charge level QJ before the second battery group adjusting process. Further, the maximum difference ΔQK can be reduced than the maximum difference ΔQ (see FIG. 4) in the estimated charge level Q before the adjustment and hence fall within the permissible range (e.g., 0.2 Ah) in the battery controller 30. Consequently, even when the controller-equipped battery pack 50 including the battery pack 20 having been subjected to the second adjusting process can be used appropriately.

Embodiment 3

A third embodiment of the invention will be explained below. The third embodiment differs in only the adjusting method of the battery pack and are identical in other configurations to those in the first embodiment. Accordingly, the following explanation will be made with a focus on the differences from the first embodiment and the explanation of other configurations will not be omitted or will be simplified.

FIG. 19 is a flowchart showing the flow of the adjusting process of the battery pack in the third embodiment.

At step S1, firstly, the estimated charge levels (see FIG. 4) of the secondary batteries 1 to 10 constituting the battery pack 20 are obtained respectively as in the first embodiment. At step 2, the secondary batteries 1 to 10 are divided into a first battery group A and a second battery group B according to the degrees of the obtained estimated charge levels of the secondary batteries 1 to 10. In the third embodiment, similarly, the secondary battery 8 is assumed as the first battery group A and the secondary batteries 1 to 7, 9, 10 are assumed as the second battery group B.

(Control Process of Second Battery Group)

At step U3 (see FIG. 19), the secondary batteries 1 to 7, 9, 10 of the second battery group B are charged by the same electric quantity to increase the charge level of the secondary batteries 5 and 6, whose charge levels are lowest in the second battery group B (the secondary batteries 1 to 7, 9, 10), than the charge level QFmin (see FIG. 20) of the first battery group A (the secondary battery 8).

At that time, there may be a case where all the battery voltages of the second battery group B (the secondary batteries 1 to 7, 9, 10) greatly rise and the maximum battery voltage difference ΔVJ between the first battery group A and the second battery group B increases than the maximum battery voltage difference ΔV before the second battery group adjusting process. If the controller-equipped battery pack 50 including the battery pack 20 having been subjected to only the second battery group adjusting process is mounted and used in a hybrid electric vehicle or the like, the battery controller 30 is likely to determine that the charge level is abnormal by regarding the maximum difference ΔQJ (see FIG. 15) in the estimated charge level QJ as exceeding the permissible range. In this condition, therefore, the controller-equipped battery pack 50 could not be used appropriately. However, by performing the first battery group adjusting process mentioned later following the second battery group adjusting process, the use of the controller-equipped battery pack 50 can be promptly enabled.

(Control Process of First Battery Group)

Figure 23:
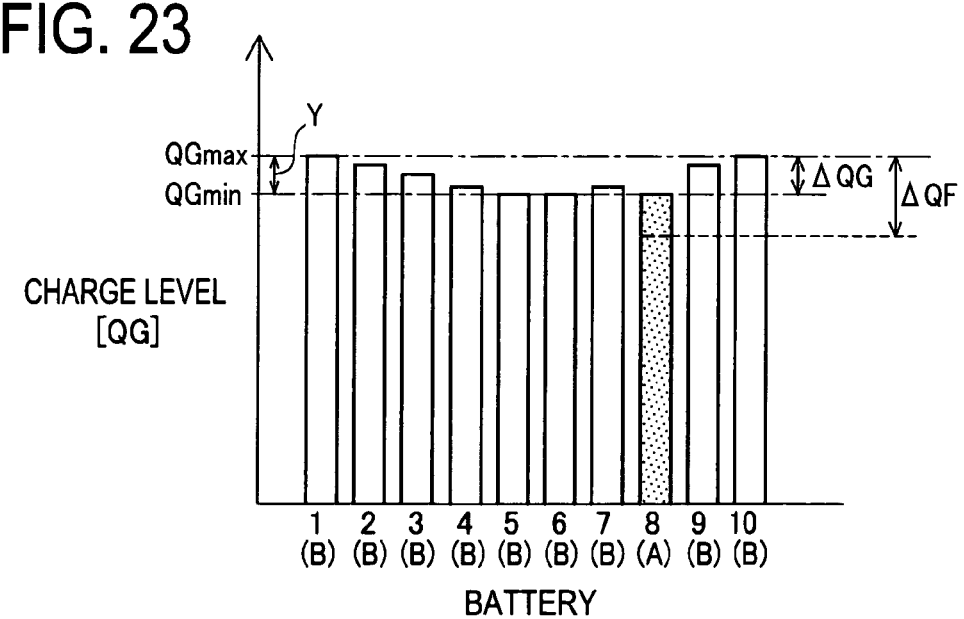
FIG. 23 is a graph showing charge levels of the secondary batteries (first and second battery groups) after the adjusting process of the first battery group in the third embodiment.

Specifically, at step U4 (see FIG. 19) following step U3, the first battery group A (the secondary battery 8) is charged to bring the charge level thereof into a charge level range Y determined based on the charge levels QG of the second battery group B having been charged in the second battery group adjusting process. This charge level range Y is defined as a range from a lowest charge level to a highest charge level of the charge levels QG of the charged second battery group B (see FIG. 23). In the third embodiment, as shown in FIG. 23, the charge level of the first battery group A (the secondary battery 8) is adjusted to be equal to the charge levels of the secondary batteries 5 and 6 whose charge levels are lowest in the second battery group B (the secondary batteries 1 to 7, 9, 10). The charge level range Y is set to meet the permissible range (e.g., 0.2 Ah) of the charge level permissible in the battery controller 30.

This makes it possible to increase the minimum charge level QGmin after the first battery group adjusting process than QFmin before the first battery group adjusting process without changing the maximum charge level QGmax after the first battery group adjusting process from QFmax before the first battery group adjusting process. It is accordingly possible to reduce the maximum difference ΔQG (a difference between the maximum charge level QGmax and a minimum charge level QGmin) in the charge level QG among the secondary batteries 1 to 10 after the first battery group adjusting process than the maximum difference ΔQF in the charge level QF among the secondary batteries 1 to 10 before the first battery group adjusting process. In other words, the difference in charge level between the first battery group A (the secondary battery 8) and the second battery group B (the secondary batteries 1 to 7, 9, 10) can be reduced.

Figure 24:
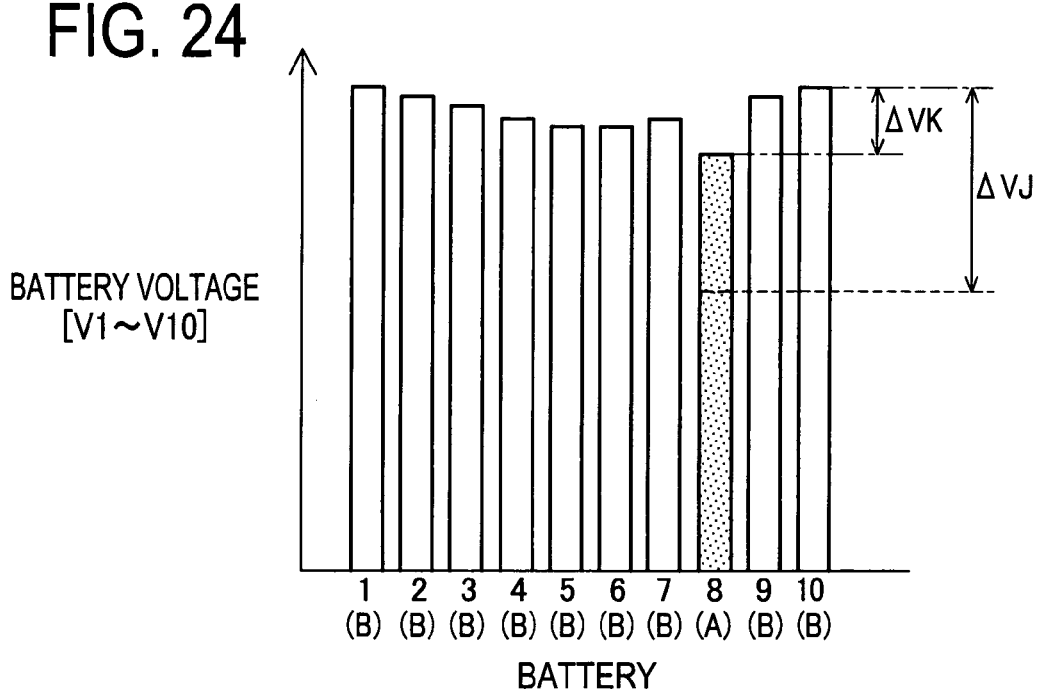
FIG. 24 is a graph showing battery voltages of the secondary batteries (first and second battery groups) after the adjusting process of the first battery group in the third embodiment.

At that time, the battery voltage of the second battery group B (the secondary batteries 1 to 7, 9, 10) remains unchanged, whereas the battery voltage of the first battery group A (the secondary battery 8) greatly increases. Accordingly, the maximum battery voltage difference ΔVK among the secondary batteries 1 to 10 can be largely reduced from the maximum battery voltage difference ΔVJ before the first battery group adjusting process as shown in FIG. 24.

If the controller-equipped battery pack 50 including the battery pack 20 having been subjected to the second and first battery group adjusting processes is mounted and used in the hybrid electric vehicle or the like, the battery controller 30 calculates an estimated charge level QK of the secondary batteries 1 to 10 (see FIG. 25) based on those battery voltages V1 to V10 (see FIG. 24) with the maximum battery voltage difference reduced to ΔVK.

Figure 25:
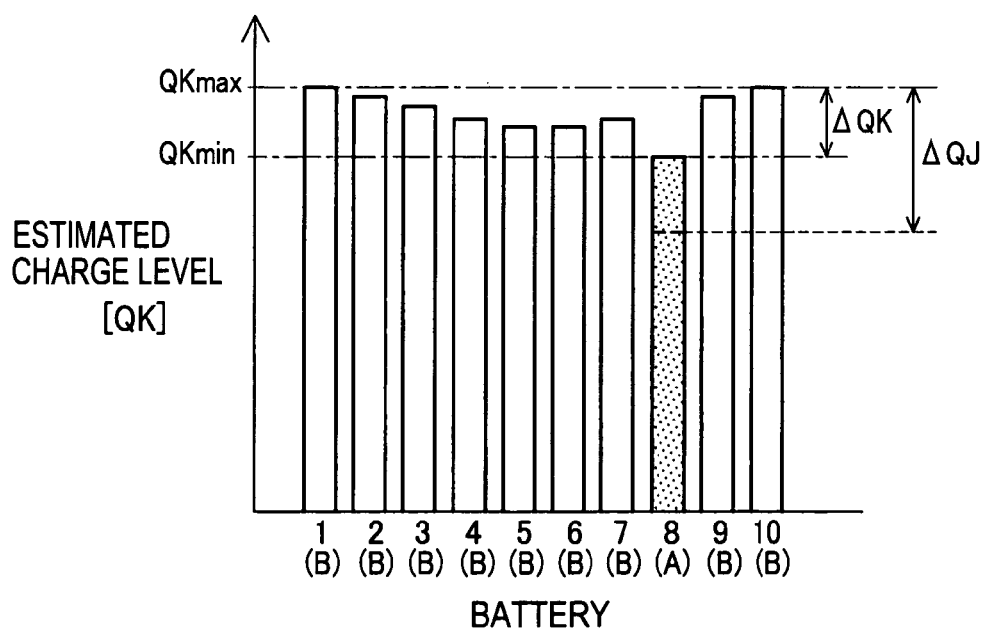
FIG. 25 is a graph showing estimated charge levels of the secondary batteries (first and second battery groups) after the adjusting process of the first battery group in the third embodiment.

Regarding this estimated charge level QK, as shown in FIG. 25, the maximum difference ΔQK between the maximum estimated charge level QKmax (the estimated charge levels of the secondary batteries 1 and 10) and the minimum estimated charge level QKmin (the estimated charge level of the secondary battery 8) can be reduced as compared with the maximum difference ΔQJ in the estimated charge level QJ before the first battery group adjusting process. Further, the maximum difference ΔQK can be reduced than the maximum difference ΔQ (see FIG. 4) in the estimated charge level Q before the adjustment and hence fall within the permissible range (e.g., 0.2 Ah) in the battery controller 30. Consequently, even when the controller-equipped battery pack 50 including the battery pack 20 having been subjected to the first adjusting process can be used appropriately.

Embodiment 4

A fourth embodiment of the invention will be explained below. The fourth embodiment differs in only the secondary battery constituting the battery pack and the adjusting method thereof and are identical in other configurations to those in the first embodiment. Accordingly, the following explanation will be made with a focus on the differences from the first embodiment and the explanation of other configurations will not be omitted or will be simplified.

A controller-equipped battery pack 150 in the fourth embodiment includes a battery pack 120 in which secondary batteries 101 to 110 are connected in series with one another and the controller battery 30 equal to that in the first embodiment as shown in FIG. 1. In the fourth embodiment, there is a case where, of the secondary batteries 101 to 110 constituting the battery pack 120, the charge level of the secondary battery 108 becomes too lower as compared with those of other secondary batteries after repetition of charge and discharge in use as shown in FIG. 27, and the battery controller 30 determines that the charge level is abnormal.

Figure 26:
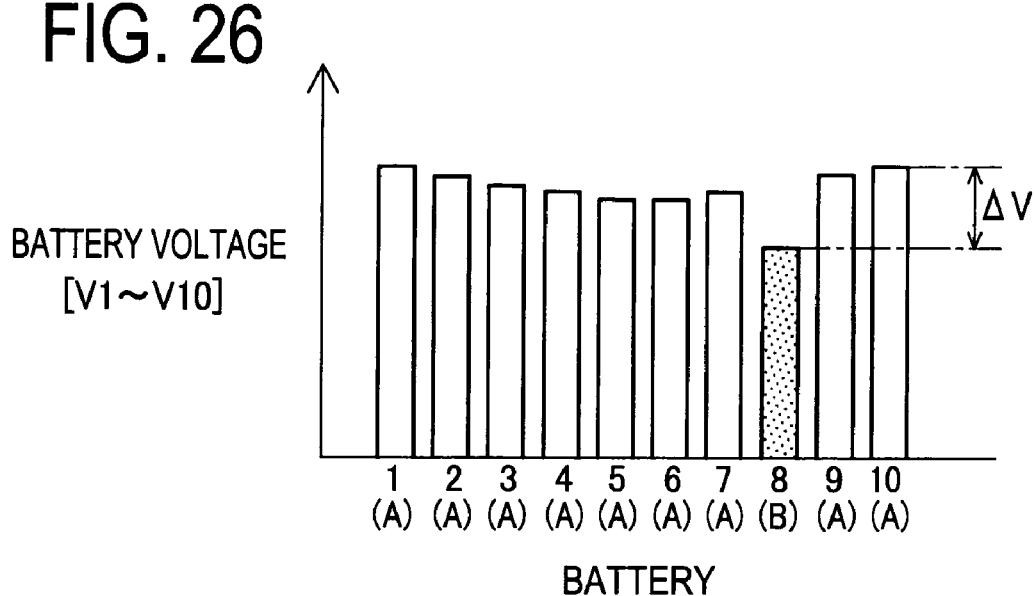
FIG. 26 is a graph showing battery voltages of the secondary batteries (first and second battery groups) before an adjusting process in a fourth embodiment.
Figure 27:
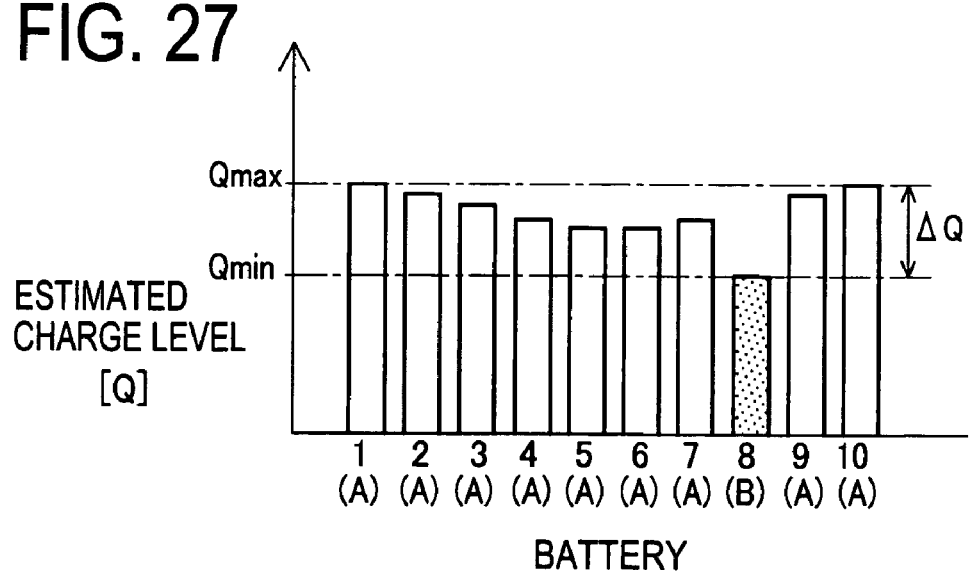
FIG. 27 is a graph showing estimated charge levels of the secondary batteries (first and second battery groups) before the adjusting process in the fourth embodiment.

FIG. 27 is a graph showing the estimated charge levels of the secondary batteries 101 to 110 estimated by the battery controller 30 based on battery voltages V1 to V10 of the secondary batteries 101 to 110. FIG. 26 is a graph showing battery voltages V1 to V10 of the secondary batteries 101 to 110 detected by the battery controller 30. In the fourth embodiment, FIGS. 26 to 34 indicate the secondary batteries 101 to 110 by using shortened numerals 1 to 10.

The battery controller 30 calculates a difference (maximum difference) ΔQ between the maximum estimated charge level Qmax (the charge levels of the secondary batteries 101 and 110 in the fourth embodiment) and the minimum estimated charge level Qmin (the charge level of the secondary battery 108 in the fourth embodiment) of the estimated charge levels Q of the secondary batteries 101 to 110. If the maximum difference ΔQ exceeds the permissible range, it is determined that the charge level of the battery pack is abnormal. As shown in FIG. 1, an abnormality signal ES is then transmitted to the controller unit 70 which executes various controls for a hybrid electric vehicle or the like. In response to this signal, the controller unit 70 generates a warning or the like to a driver or the like.

Figure 28:
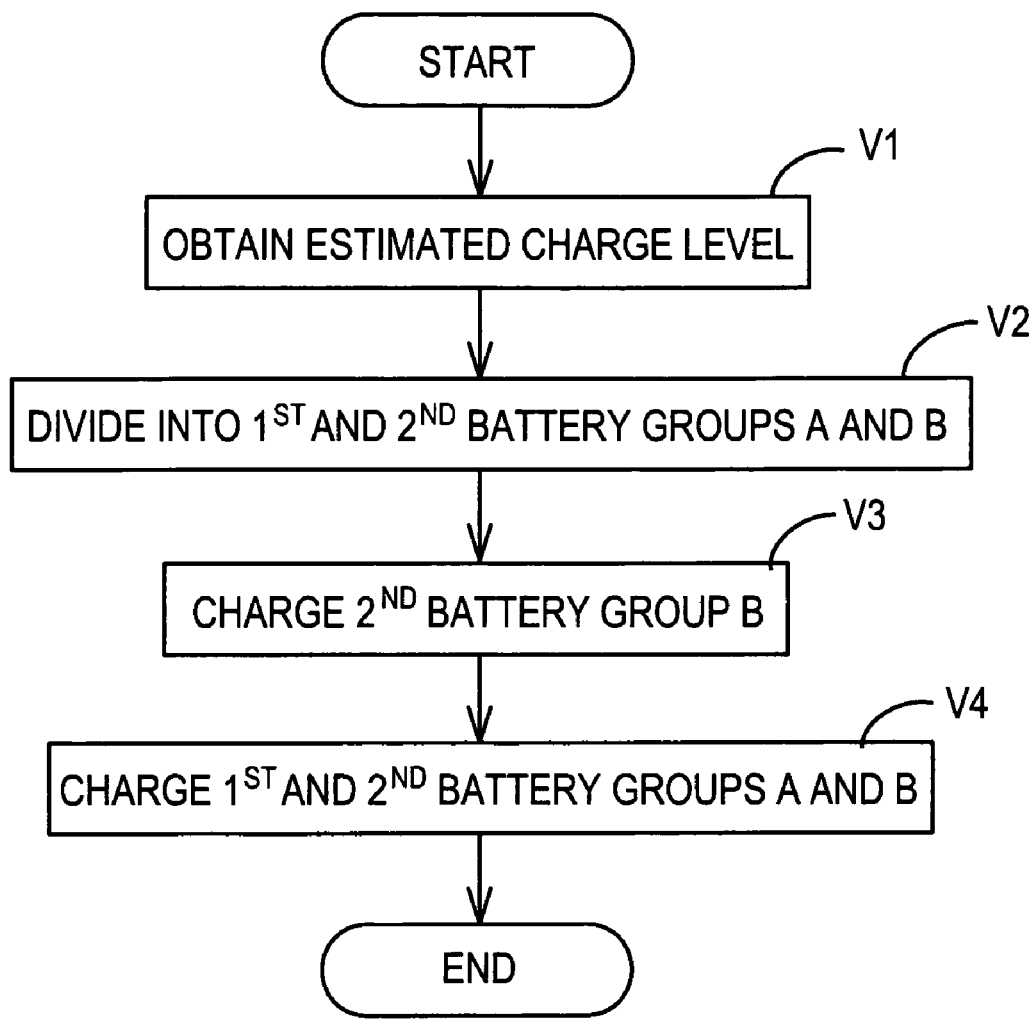
FIG. 28 is a flowchart showing the flow of an adjusting process of a battery pack in a fourth embodiment.

When the charge level is determined to be abnormal as above, the charge level is adjusted as follows in the fourth embodiment. FIG. 28 is a flowchart showing the flow of an adjusting process of the battery pack in the fourth embodiment.

At step V1, as in the first embodiment, the estimated charge levels (see FIG. 27) of the secondary batteries 101 to 110 constituting the battery pack 120. At step V2, the secondary batteries 101 to 110 are divided into a first battery group A and a second battery group B according to the degrees of the obtained estimated charge levels Q of the secondary batteries 101 to 110. In the fourth embodiment, the secondary batteries 101 to 107, 109, and 110 with a relatively high charge level are assumed as the first battery group A and the secondary battery 108 with a lower charge level than that of the first battery group A is assumed as the second battery group B.

(First Adjusting Process)

Figure 29:
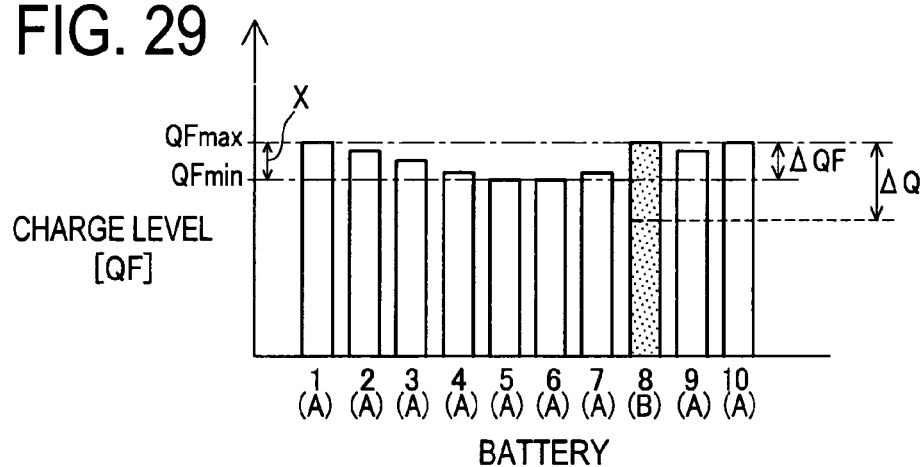
FIG. 29 is a graph showing charge levels a secondary batteries (first and second battery groups) after the first adjusting process in the fourth embodiment.

At step V3 (see FIG. 28), the second battery group B (the secondary battery 108) is charged so that the charge level of the second battery group B falls within a charge level range X determined based on the charge levels of the first battery group A (the secondary batteries 101 to 107, 109, 110) as shown in FIG. 29. In the fourth embodiment, the charge level range X is defined as a range from a lowest charge level to a highest charge level of the charge levels of the first battery group A. In the fourth embodiment, as shown in FIG. 29, the charge level of the second battery group B is adjusted to be equal to the charge levels QFmax (=Qmax) of the secondary batteries 101 and 110 whose charge levels are highest in the first battery group A. The charge level range X is set to meet the permissible range (e.g., 0.2 Ah) of the charge level permissible in the battery controller 30.

To be concrete, as shown in FIG. 2, the well known constant current charge and discharge device 80 is disposed by connecting its first terminal 81 to the positive terminal 8b of the secondary battery 108 of the second battery group B and its second terminal 82 to the negative terminal 8c of the secondary battery 108 of the second battery group B. In this state, constant current charge was carried out. Regarding the secondary batteries 101 to 110 after the first adjusting process, accordingly, the maximum difference ΔQF in the charge level QF can be made equal to the maximum charge level difference among the secondary batteries of the first battery group A before the first adjusting process and reduced as compared with ΔQ before the first adjusting process. In other words, the charge level difference between the second battery group B (the secondary battery 108) and the first battery group A (the secondary batteries 101 to 107, 109, 110) can be reduced.

However, if only the second battery group B (the secondary battery 108) is charged in the aforementioned first adjusting process, the battery voltage V8 of the second battery group B greatly rises temporarily. This may result in that the maximum battery voltage difference ΔVJ among the secondary batteries 101 to 110 after the first adjusting process (a battery voltage difference between the secondary battery 108 of the second battery group B and the secondary batteries 105 and 106 whose battery voltages are lowest in the first battery group A) is larger than the maximum battery voltage difference ΔV before the first adjusting process as shown in FIG. 30.

Figure 30:
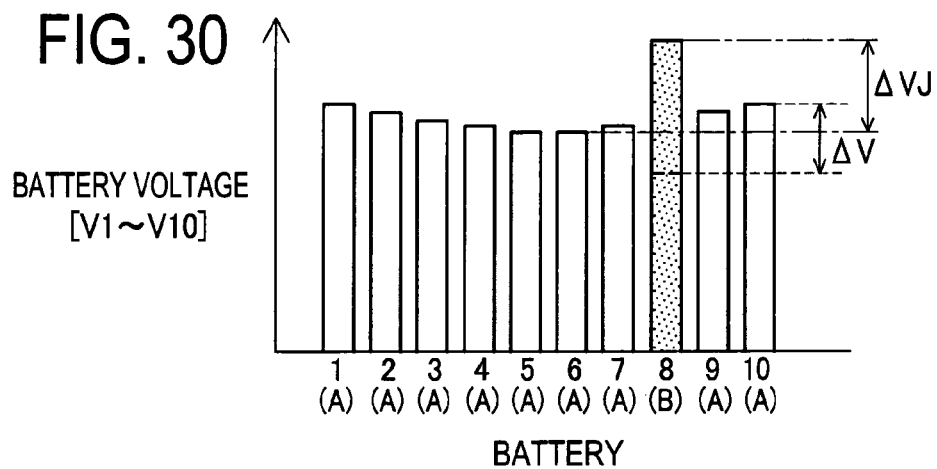
FIG. 30 is a graph showing battery voltages of the secondary batteries (first and second battery groups) after the first adjusting process in the fourth embodiment.
Figure 31:
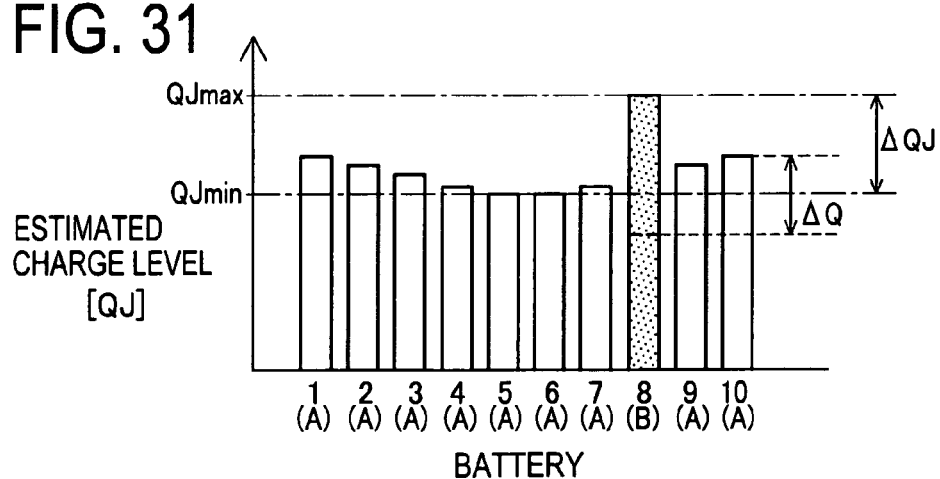
FIG. 31 is a graph showing estimated charge levels of the secondary batteries (first and second battery groups) after the first adjusting process in the fourth embodiment.

If the controller-equipped battery pack 150 including the battery pack 120 having been subjected to only the first adjusting process is mounted and used in the hybrid electric vehicle or the like, the battery controller 30 calculates the estimated charge level QJ based on those battery voltages V1 to V10 (see FIG. 30). Accordingly, the battery controller 30 is likely to estimate that the estimated charge level QJ of the second battery group B (the secondary battery 108) after the first adjusting process is a value QJmax which is extremely larger than the charge level QFmax (see FIG. 29) of the second battery group B (the secondary battery 108).

Consequently, regarding the estimated charge levels QJ of the secondary batteries 101 to 110 after the first adjusting process, the battery controller 30 will calculate the difference (the maximum difference) ΔQJ between the maximum estimated charge level QJmax (the charge level of the secondary battery 108) and the minimum estimated charge level QJmin (the charge level of the secondary batteries 105 and 106) and judge this maximum difference ΔQJ as exceeding the permissible range, and come to a conclusion that the charge level is abnormal. Thus, even though the maximum difference ΔQF (see FIG. 29) among the charge levels of the secondary batteries 101 to 110 is adjusted to fall within the permissible range (e.g. within 0.2 Ah) of the battery controller 30 in the first adjusting process, the controller-equipped battery pack 50 could not be used appropriately.

In this regard, if the second battery group B (the secondary battery 108) is charged in the first adjusting process and then is left to stand for a long time (e.g. several days), the battery voltage V8 of the second battery group B (the secondary battery 108) that has temporarily increased will be recovered. When the controller-equipped battery pack 50 is thereafter mounted and used in a hybrid electric vehicle or the like for example, the battery controller 30 will not determine that the charge level is abnormal, under the influence of temporary increase of battery voltage. This is however low in working efficiency and could not respond to a demand for promptest use of the controller-equipped battery pack 150.

In the fourth embodiment, therefore, a second adjusting process mentioned later is conducted following the first adjusting process to enable the prompt use of the controller-equipped battery pack 150.

(Second Adjusting Process)

Figure 32:
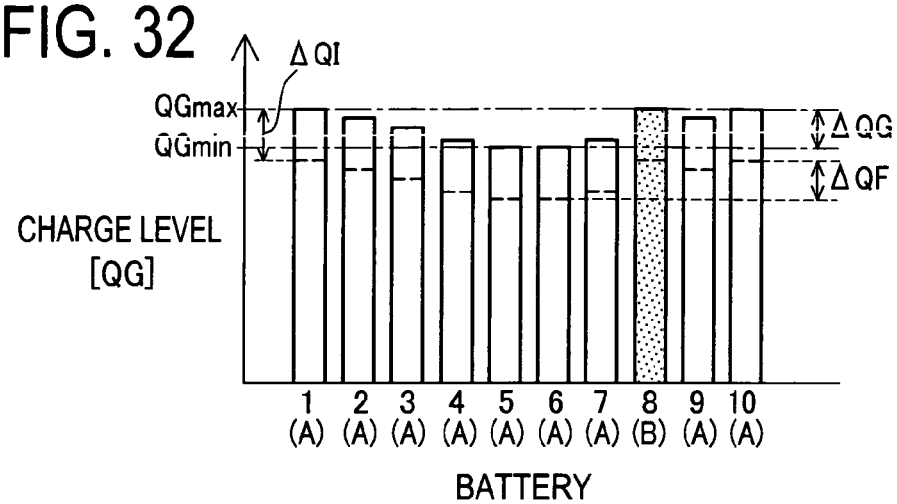
FIG. 32 is a graph showing charge levels of the secondary batteries (first and second battery groups) after a second adjusting process in the fourth embodiment.

Specifically, at step V4 (see FIG. 28) following step V3, both of the first battery group A and the second battery group B (i.e. all of the secondary batteries 101 to 110 constituting the battery pack 120) are charged by the same electric quantity $\Delta QI$ as shown in FIG. 32. To be concrete, for example, the secondary batteries 101 to 110 electrically connected in series with one another are charged at once by use of the constant current charge and discharge device 80.

As a result, the charge levels of the secondary batteries 101 to 110 are increased by $\Delta QI$ respectively, whereas the maximum difference $\Delta QG$ (a charge level difference between the maximum charge level QGmax and the minimum charge level QGmin) in the charge level QG among the secondary batteries 101 to 110 after the second adjusting process remains unchanged from the maximum difference $\Delta QF$ in the charge level QF before the second adjusting process.

Figure 33:
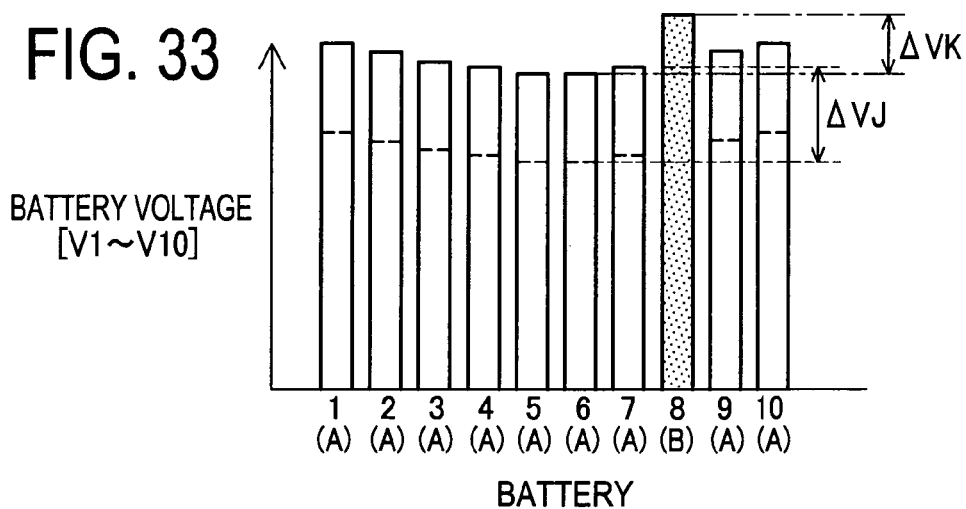
FIG. 33 is a graph showing battery voltages of the secondary batteries (first and second battery groups) after the second adjusting process in the fourth embodiment.
Figure 34:
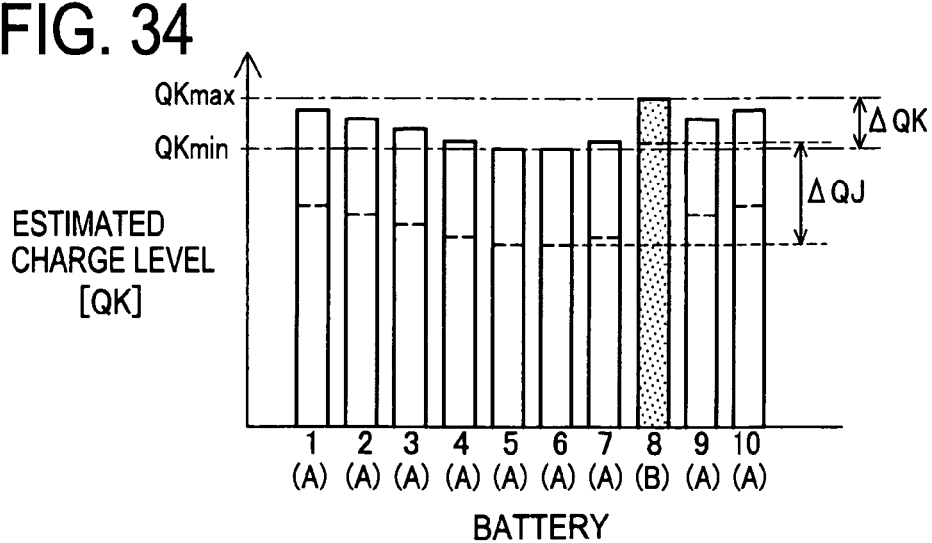
FIG. 34 is a graph showing estimated charge levels of the secondary batteries (first and second battery groups) after the second adjusting process in the fourth embodiment.
Figure 35:
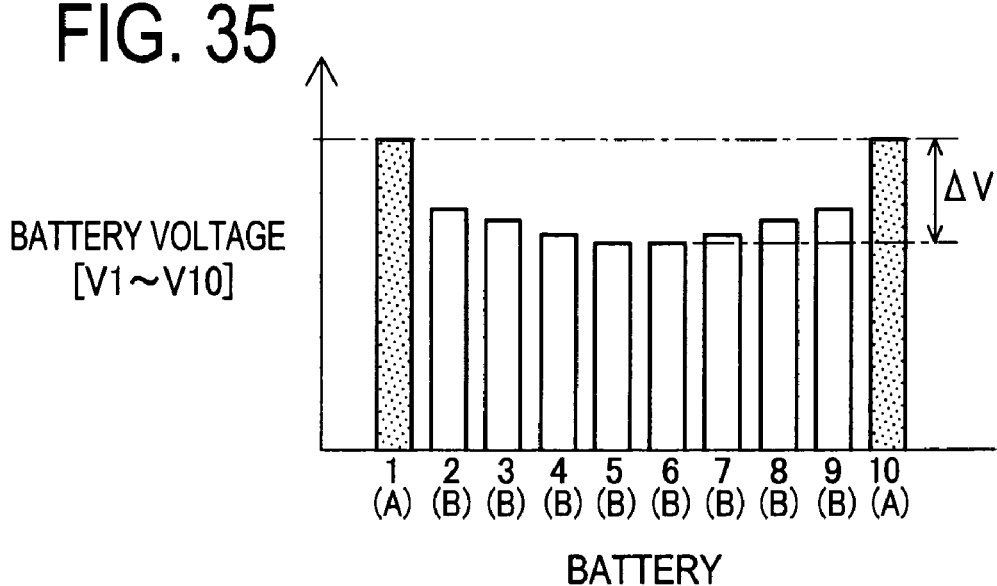
FIG. 35 is a graph showing battery voltages of secondary batteries (first and second battery groups) before adjustment in a fifth embodiment.

On the other hand, as shown in FIG. 33, the maximum battery voltage difference among the secondary batteries 101 to 110 after the second adjusting process can be reduced from $\Delta VJ$ to $\Delta VK$. This is because the battery voltage (V1 to V7, V9, V10) of the first battery group A (the secondary batteries 101 to 107, 109, 110) greatly increases by charge in the second adjusting process, whereas the battery voltage of the second battery group B (the secondary battery 108) having been already charged in the first adjusting process will increase at a lower increasing rate as compared with the first battery group A even if the second battery group B is charged again in the second adjusting process.

Consequently, when the controller-equipped battery pack 150 including the battery pack 120 having been subjected to the first and second adjusting processes is mounted and used in the hybrid electric vehicle or the like, the battery controller 30 calculates the estimated charge levels QK of the secondary batteries 101 to 110 (see FIG. 34) based on the battery voltages V1 to V10 with a maximum battery voltage difference reduced to $\Delta VK$ (see FIG. 33).

Regarding this estimated charge level QK, the maximum difference $\Delta QK$ between the maximum estimated charge level QKmax (the estimated charge level of the secondary battery 108) and the minimum estimated charge level QKmin (the estimated charge levels of the secondary batteries 101 and 110) can be reduced as compared with the maximum difference $\Delta QJ$ in the estimated charge level QJ before the second adjusting process. Further, it can be reduced than the maximum difference $\Delta Q$ (see FIG. 27) in the estimated charge level Q before adjustment and hence fall within the permissible range (e.g. 0.2 Ah) in the battery controller 30.

The controller-equipped battery pack 150 including the battery pack 120 having been subjected to the second adjusting process can be used appropriately.

According to the adjusting method in the fourth embodiment, additionally, the battery voltage difference $\Delta VJ$ among the secondary batteries 101 to 110 after the first adjusting process is reduced, so that the secondary batteries 101 to 110 do not have to be left stand for a long time. Thus, the adjustment of the battery pack 120 can be completed in a short time.

Meanwhile, because of a difference in characteristic from the first battery group A (the secondary batteries 101 to 107, 109, 110), the second battery group B (the secondary battery 108) is apt to gradually decrease the charge level during subsequent use (charge and discharge) as compared with the first battery group A even if the charge level is adjusted in the above manner. Thus, the charge level of the second battery group B may become lower than that of the first battery group A again.

In the adjusting method in the fourth embodiment, therefore, the charge level of the second battery group B (the secondary battery 108) is adjusted to be equal to the charge level QFmax of the secondary batteries 101 and 110 whose charge level are highest in the first battery group A (the secondary batteries 101 to 107, 109, 110) (see FIG. 29) in the first adjusting process. In this way, it is possible to delay the time until the charge level of the second battery group B decreases due to the subsequent use (charge and discharge) than that of the first battery group A again, that is, until the estimated charge level Q is returned to the condition shown in FIG. 27 again. Accordingly, the battery pack 120 can be used properly over a longer period.

Embodiment 5

A fifth embodiment of the invention will be explained below. The fifth embodiment differs in only the secondary batteries constituting the battery pack and the adjusting method thereof and are identical in other configurations to those in the first embodiment. Accordingly, the following explanation will be made with a focus on the differences from the first embodiment and the explanation of other configurations will not be omitted or will be simplified.

Figure 36:
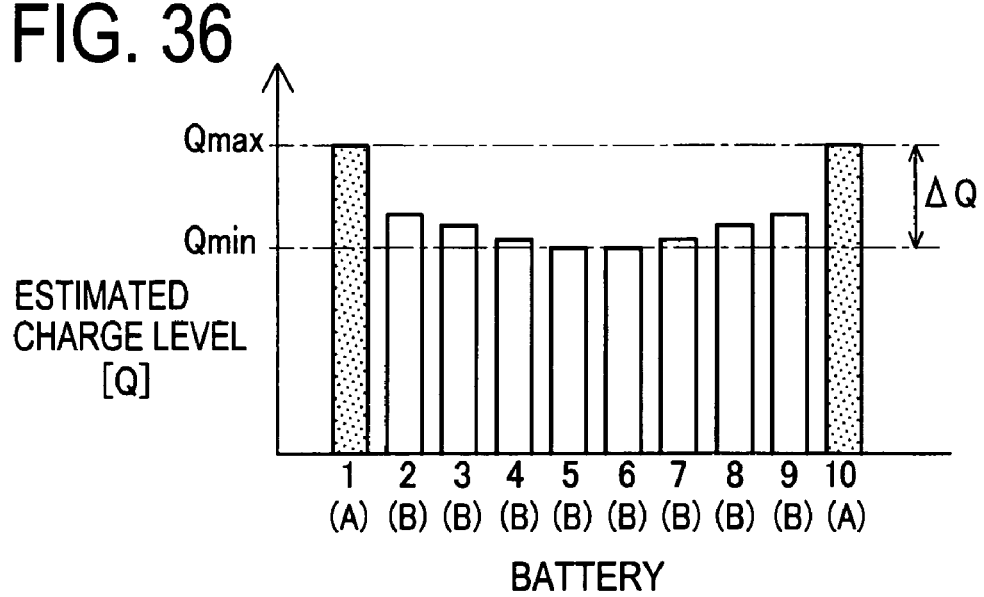
FIG. 36 is a graph showing estimated charge levels of the secondary batteries (first and second battery groups) before the adjustment in the fifth embodiment.

A controller-equipped battery pack 250 in the fifth embodiment includes a battery pack 220 in which secondary batteries 201 to 210 are connected in series with one another and the controller battery 30 equal to that in the first embodiment as shown in FIG. 1. In the fifth embodiment, there is a case where the charge levels of the secondary batteries 201 and 210 of the secondary batteries 201 to 210 constituting the battery pack 220 become too higher as compared with those of other secondary batteries after repetition of charge and discharge in use as shown in FIG. 36, and the battery controller 30 determines that the charge level of the battery pack 220 are abnormal.

The battery pack 220 in the fifth embodiment may include a configuration that the secondary batteries 201 to 210 are arranged in a row and the secondary batteries 201 and 210 at both ends are easy to cool as compared with other secondary batteries 202 to 209 interposed between those secondary batteries 201 and 210. In such battery pack 220, the secondary batteries 201 and 210 are less deteriorated as compared with other secondary batteries 202 to 209 because an ambient temperature around the secondary batteries 201 and 210 in use is low. Thus, the charge levels of the secondary batteries 201 and 210 tend to gradually increase after repetition of charge and discharge.

In the fifth embodiment, FIGS. 35 to 43 indicate the secondary batteries 201 to 210 by using shortened numerals 1 to 10.

The battery controller 30 calculates a difference (maximum difference) $\Delta Q$ between the maximum estimated charge level Qmax (the charge levels of the secondary batteries 201 and 210 in the fifth embodiment) and the minimum estimated charge level Qmin (the charge levels of the secondary batteries 205 and 206 in the fifth embodiment) of the estimated charge levels Q of the secondary batteries 201 to 210. If the maximum difference $\Delta Q$ exceeds the permissible range, it is determined that the charge level of the battery pack 220 is abnormal. As shown in FIG. 1, an abnormality signal ES is then transmitted to the controller unit 70 which executes various controls for a hybrid electric vehicle or the like. In response to this signal, the controller unit 70 generates a warning or the like to a driver or the like.

Figure 37:
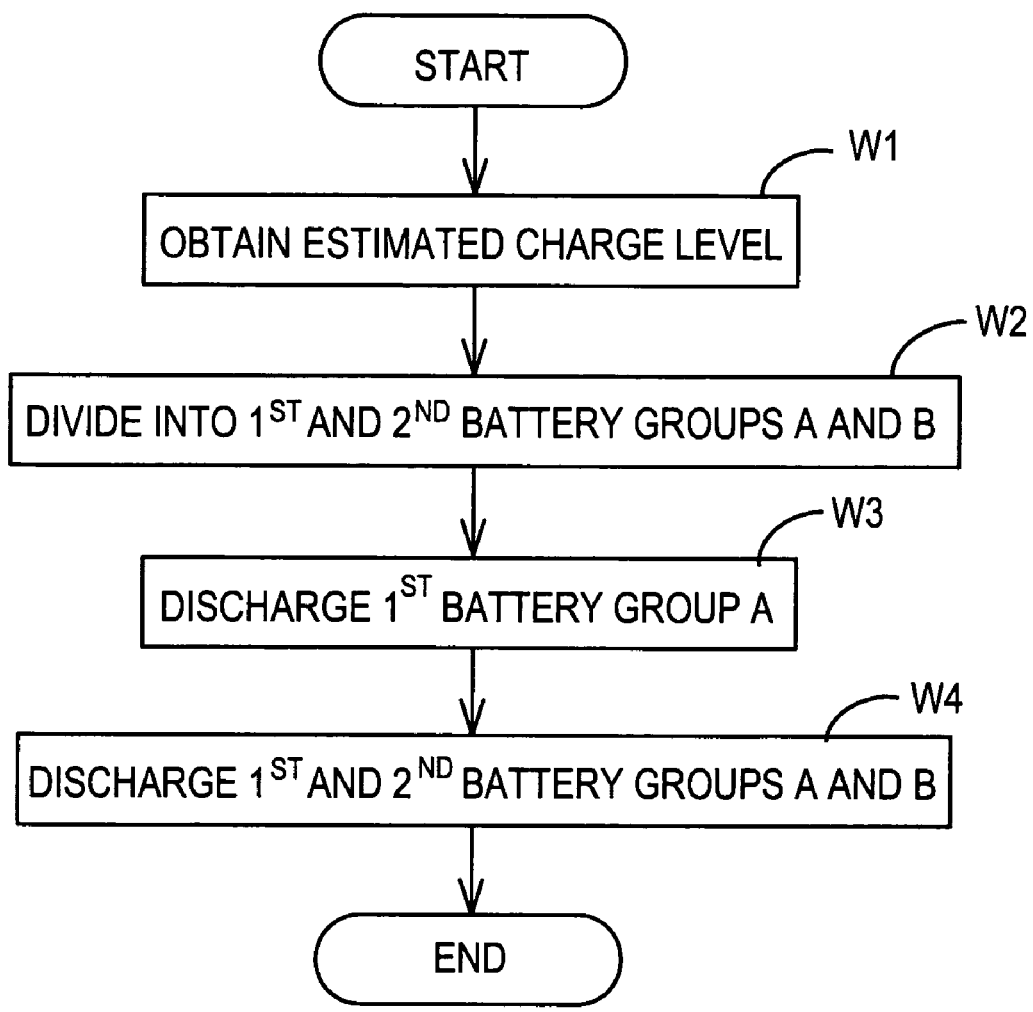
FIG. 37 is a flowchart showing the flow of the adjusting process of a battery pack in the fifth embodiment.

When it is detected that the charge level is abnormal as above, the charge level is adjusted as follows in the fifth embodiment. FIG. 37 is a flowchart showing the flow of an adjusting process of the battery pack 220 in the fifth embodiment.

At step W1, as in the first embodiment, the estimated charge levels (see FIG. 36) of the secondary batteries 201 to 210 constituting the battery pack 220 are obtained. At step W2, the secondary batteries 201 to 210 are divided into a first battery group A and a second battery group B according to the degrees of the obtained estimated charge levels Q of the secondary batteries 201 to 210. In the fifth embodiment, the secondary batteries 201 and 210 with a relatively high charge level are assumed as the first battery group A and the secondary batteries 202 to 209 with a lower charge level than that of the first battery group A are assumed as the second battery group B.

(First Adjusting Process)

Figure 38:
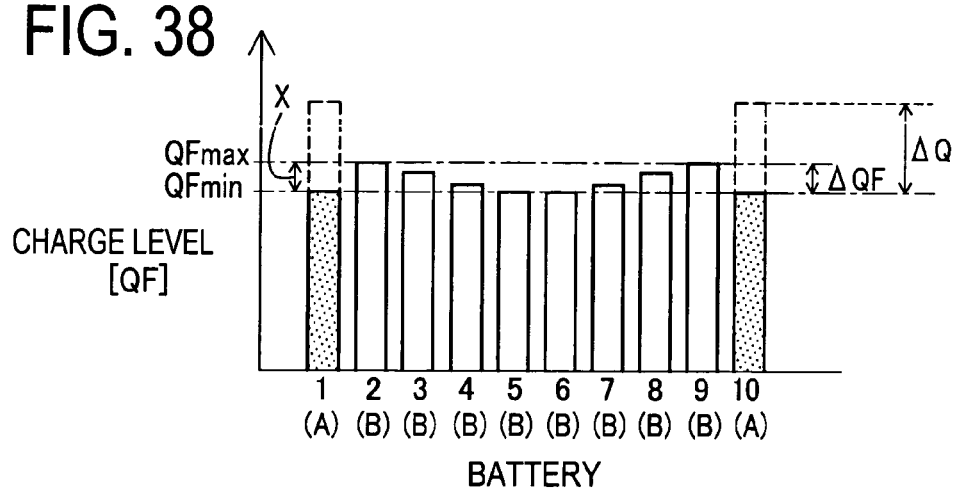
FIG. 38 is a graph showing charge levels of the secondary batteries (first and second battery groups) after a first adjusting process in the fifth embodiment.

At step W3 (see FIG. 37), the first battery group A (the secondary batteries 201 and 210) is discharged so that the charge level of the secondary batteries of the first battery group A falls within a charge level range X determined based on the charge levels of the second battery group B (the secondary batteries 202 to 209) as shown in FIG. 38. In the fifth embodiment, the charge level range X is defined as a range from a lowest charge level to a highest charge level of the charge levels of the second battery group B. In the fifth embodiment, as shown in FIG. 38, the charge levels of the secondary batteries of the first battery group A adjusted to be equal to the charge levels of the secondary batteries 205 and 206 whose charge levels are lowest in the second battery group B. The charge level range X is set to meet the permissible range (e.g., 0.2 Ah) of the charge level permissible in the battery controller 30.

Regarding the secondary batteries 201 to 210 after the first adjusting process, accordingly, the maximum difference $\Delta QF$ in the charge level QF can be made equal to the maximum charge level difference among the secondary batteries of the second battery group B before the first adjusting process and reduced than the difference $\Delta Q$ determined before the first adjusting process as shown in FIG. 38. In other words, the charge level difference between the first battery group A (the secondary batteries 201 and 210) and the second battery group B (the secondary batteries 202 to 209) can be reduced.

However, if only the first battery group A is discharged in the aforementioned first adjusting process, the battery voltages V1 and V10 of the first battery group A (the secondary batteries 201 and 210) greatly decrease temporarily. This may result in that the maximum battery voltage difference $\Delta VJ$ among the secondary batteries 201 to 210 after the first adjusting process (a battery voltage difference between the secondary batteries 201 and 210 of the first battery group A and the secondary batteries 202 and 209 whose battery voltages are highest in the second battery group B) is larger than the maximum battery voltage difference $\Delta V$ before the first adjusting process as shown in FIG. 39.

Figure 39:
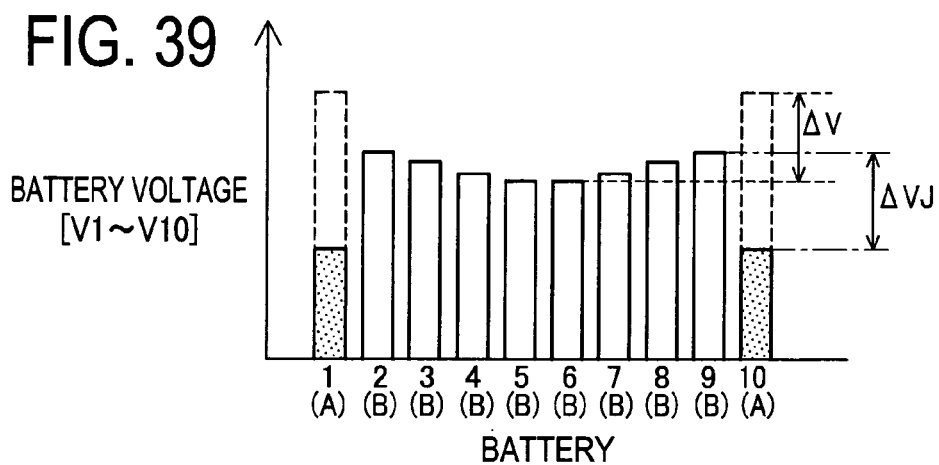
FIG. 39 is a graph showing battery voltages of the secondary batteries (first and second battery groups) after the first adjusting process in the fifth embodiment.
Figure 40:
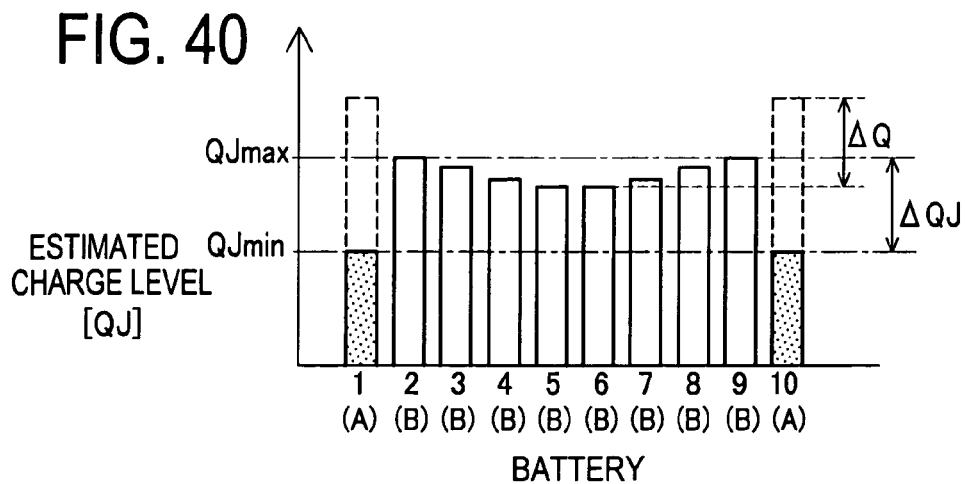
FIG. 40 is a graph showing estimated charge levels of the secondary batteries (first and second battery groups) after the first adjusting process in the fifth embodiment.

If the controller-equipped battery pack 250 including the battery pack 220 having been subjected to only the first adjusting process is mounted and used in the hybrid electric vehicle or the like, the battery controller 30 calculates the estimated charge level QJ based on those battery voltages V1 to V10 (see FIG. 39). Accordingly, the battery controller 30 is likely to estimate that the estimated charge level QJ of the first battery group A (the secondary batteries 201 and 210) after the first adjusting process is a value QJmin which is extremely smaller than the charge level QFmin (see FIG. 38) of the first battery group A (the secondary batteries 201 and 210).

Consequently, regarding the estimated charge levels QJ of the secondary batteries 201 to 210 after the first adjusting process, the battery controller 30 will calculate the difference (maximum difference) $\Delta QJ$ between the maximum estimated charge level QJmax (the charge levels of the secondary batteries 202 and 209) and the minimum estimated charge level QJmin (the charge level of the secondary batteries 201 and 210) and judge this maximum difference $\Delta QJ$ as exceeding the permissible range, and come to a conclusion that the charge level of the battery pack 220 are abnormal. Thus, even though the maximum difference $\Delta QF$ (see FIG. 38) among the charge levels of the secondary batteries 201 to 210 is adjusted to fall within the permissible range (e.g. within 0.2 Ah) of the battery controller 30 in the first adjusting process, the controller-equipped battery pack 250 could not be used appropriately.

In this regard, if the first battery group A is discharged in the first adjusting process and then is left to stand for a long time (e.g. several days), the battery voltages V1 and V10 of the first battery group A (the secondary batteries 201 and 210) that have temporarily decreased will be recovered. When the controller-equipped battery pack 250 is thereafter mounted and used in a hybrid electric vehicle or the like for example, the battery controller 30 will not determine that the charge level is abnormal, under the influence of temporary decrease of battery voltage. This is however low in working efficiency and could not respond to a demand for promptest use of the controller-equipped battery pack 250.

In the fifth embodiment, therefore, a second adjusting process mentioned later is conducted following the first adjusting process to enable the prompt use of the controller-equipped battery pack 250.

(Second Adjusting Process)

Figure 41:
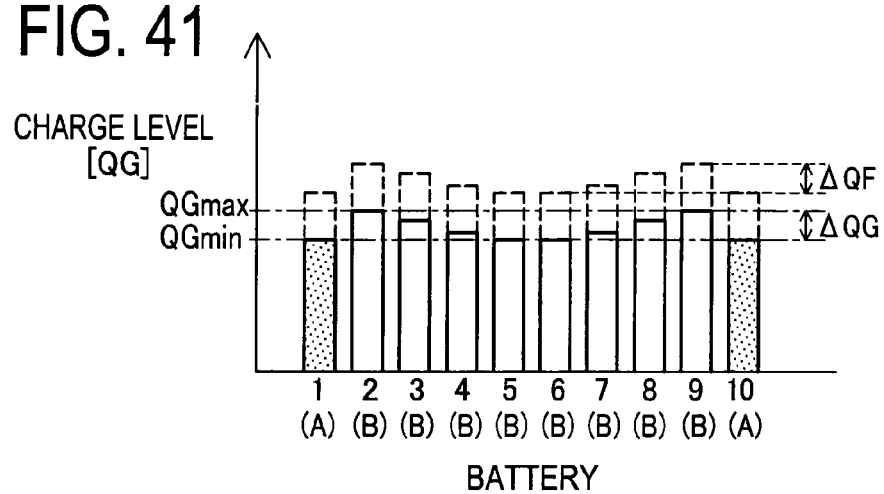
FIG. 41 is a graph showing charge levels of the secondary batteries (first and second battery groups) after a second adjusting process in the fifth embodiment.

Specifically, at step W4 (see FIG. 37) following step W3, both of the first battery group A and the second battery group B (i.e. all of the secondary batteries 201 to 210 constituting the battery pack 220) are discharged by the same electric quantity as shown in FIG. 41. To be concrete, for example, the secondary batteries 201 to 210 connected in series with one another are discharged at once by use of the constant current charge and discharge device 80 (see FIG. 2).

As a result, the charge level of the secondary batteries 201 to 210 are decreased by the same electric quantity respectively, whereas the maximum difference $\Delta QG$ (a charge level difference between the maximum charge level QGmax and the minimum charge level QGmin) in the charge level QG among the secondary batteries 201 to 210 after the second adjusting process remains unchanged from the maximum difference $\Delta QF$ in the charge level QF before the second adjusting process.

Figure 42:
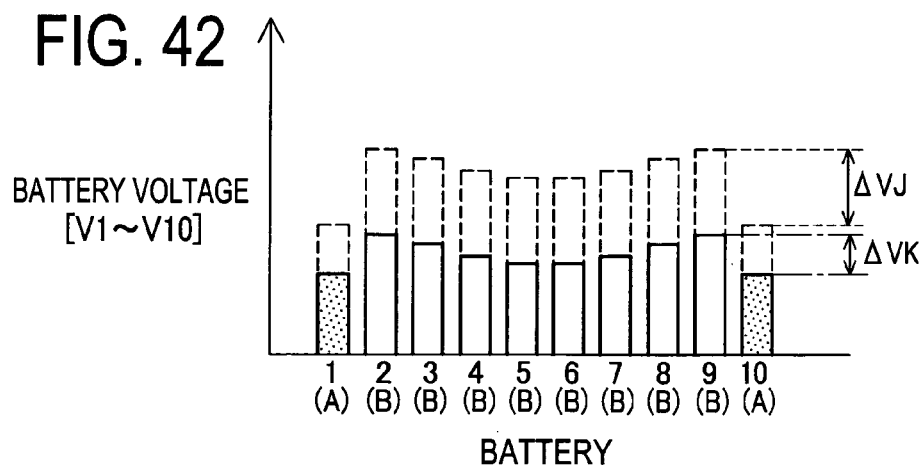
FIG. 42 is a graph showing battery voltages of the secondary batteries (first and second battery groups) after the second adjusting process in the fifth embodiment.
Figure 43:
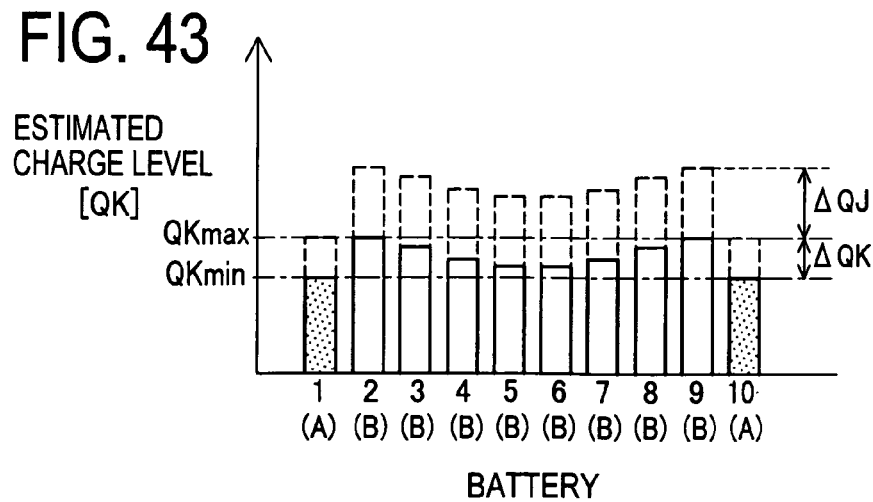
FIG. 43 is a graph showing estimated charge levels of the secondary batteries (first and second battery groups) after the second adjusting process in the fifth embodiment.

On the other hand, as shown in FIG. 42, the maximum battery voltage difference among the secondary batteries 201 to 210 after the second adjusting process can be reduced from $\Delta VJ$ to $\Delta VK$. This is because the battery voltage (V2 to V9) of the second battery group B (the secondary batteries 202 to 209) greatly decreases by discharge in the second adjusting process, whereas the battery voltage of the first battery group A (the secondary batteries 201 and 210) having been already discharged in the first adjusting process will decrease at a lower decreasing rate as compared with the second battery group B even if the first battery group A is discharged again in the second adjusting process.

Consequently, when the controller-equipped battery pack 250 provided with the battery pack 220 having been subjected to the first and second adjusting processes is mounted and used in the hybrid electric vehicle or the like, the battery controller 30 calculates the estimated charge levels QK of the secondary batteries 201 to 210 (see FIG. 43) based on the battery voltages V1 to V10 with a maximum battery voltage difference reduced to ΔVK (see FIG. 42).

Regarding this estimated charge level QK, the maximum difference ΔQK between the maximum estimated charge level QKmax (the estimated charge levels of the secondary batteries 202 and 209) and the minimum estimated charge level QKmin (the estimated charge levels of the secondary batteries 201 and 210) can be reduced than the maximum difference ΔQJ in the estimated charge level QJ before the second adjusting process. Further, the maximum difference ΔQK can be reduced than the maximum difference ΔQ (see FIG. 36) in the estimated charge level Q before adjustment and hence fall within the permissible range (e.g. 0.2 Ah) in the battery controller 30.

The controller-equipped battery pack 250 including the battery pack 220 having been subjected to the second adjusting process can be used appropriately.

According to the adjusting method in the fifth embodiment, additionally, the battery voltage difference ΔVJ among the secondary batteries 201 to 210 after the first adjusting process is reduced, so that the secondary batteries 201 to 210 do not have to be left stand for a long time. Thus, the adjustment of the battery pack 220 can be completed in a short time.

Embodiment 6

A sixth embodiment of the invention will be explained below. The sixth embodiment differs in only the adjusting method of the battery pack and are identical in other configurations to those in the first embodiment. Accordingly, the following explanation will be made with a focus on the differences from the first embodiment and the explanation of other configurations will not be omitted or will be simplified.

Figure 44:
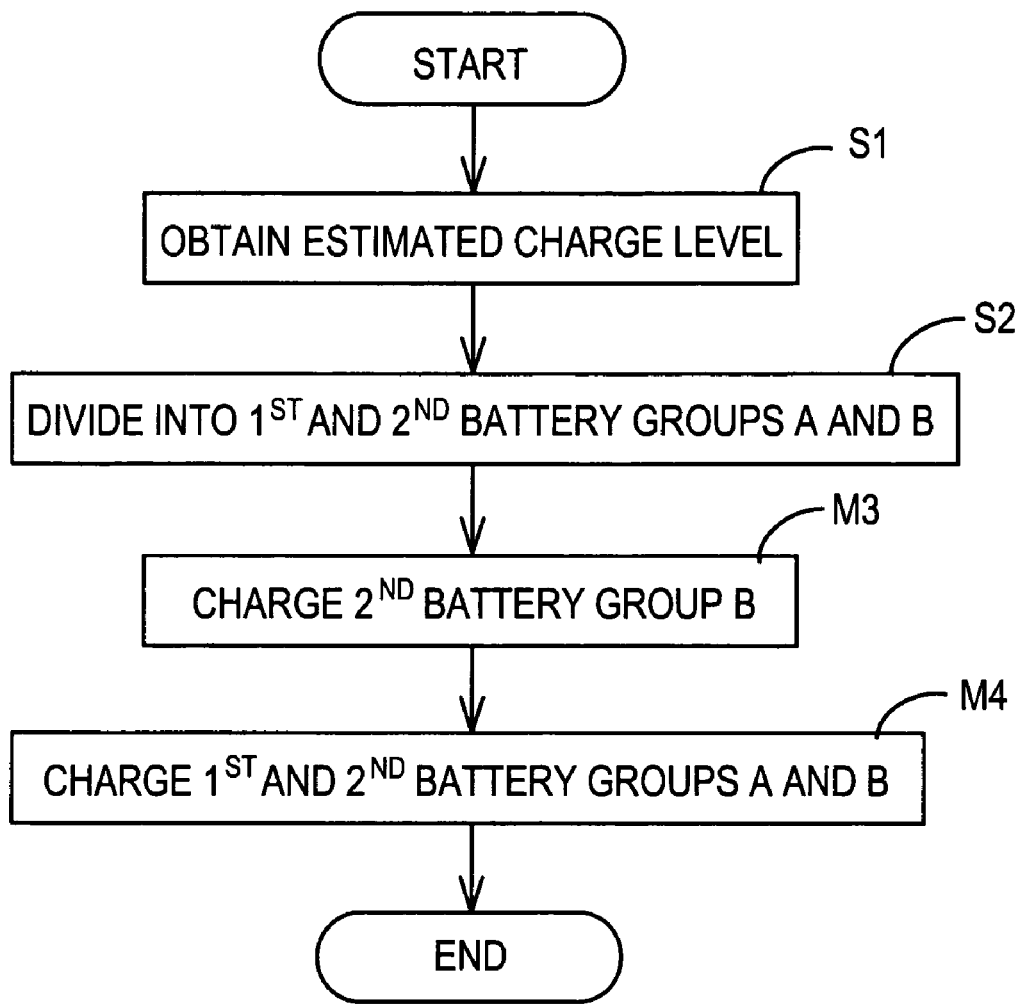
FIG. 44 is a flowchart showing the flow of an adjusting process of a battery pack in a sixth embodiment.

FIG. 44 is a flowchart showing the flow of the adjusting process of the battery pack in the sixth embodiment.

At step S1, firstly, the estimated charge levels (see FIG. 4) of the secondary batteries 1 to 10 constituting the battery pack 20 are obtained respectively as in the first embodiment. At step 2, the secondary batteries 1 to 10 are divided into a first battery group A and a second battery group B according to the degrees of the obtained estimated charge levels of the secondary batteries 1 to 10. In the sixth embodiment, similarly, the secondary battery 8 is assumed as the first battery group A and the secondary batteries 1 to 7, 9, 10 are assumed as the second battery group B.

(First Adjusting Process)

Figure 45:
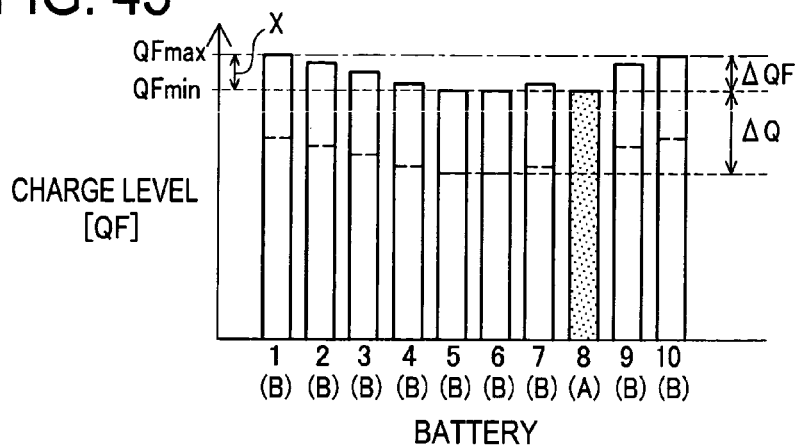
FIG. 45 is a graph showing charge levels of secondary batteries (first and second battery groups) after a first adjusting process in the sixth embodiment.

At step M3 (see FIG. 44), the secondary batteries 1 to 7, 9, 10 of the second battery group B are charged by the same electric quantity respectively so that the charge level of the first battery group A falls within a charge level range X determined based on the charge levels of the charged second battery group B as shown in FIG. 45. In the sixth embodiment, the charge level range X is defined as a range from a lowest charge level to a highest charge level of the charge levels of the second battery group B. In the sixth embodiment, as shown in FIG. 45, the secondary batteries 1 to 7, 9, 10 of the second battery group B are charged by ΔQ respectively to make the charge levels QFmin of the secondary batteries 5 and 6 whose charge levels are lowest in the second battery group B after the first adjusting process equal to the charge level of the secondary battery 8 of the first battery group A. To be concrete, the secondary batteries 1 to 7, 9, 10 of the second battery group B electrically connected in series with one another are charged at once by use of the constant current charge and discharge device 80 (see FIG. 2).

The charge level range X is set to meet the permissible range (e.g., 0.2 Ah) of the charge level permissible in the battery controller 30. Further, ΔQ is a difference (maximum difference) between the maximum estimated charge level Qmax (the charge level of the secondary battery 8 in the sixth embodiment) and the minimum estimated charge level Qmin (the charge levels of the secondary batteries 5 and 6 in the sixth embodiment) of the estimated charge levels of the secondary batteries 1 to 10 before the first adjusting process as mentioned above (see FIG. 4).

Regarding the secondary batteries 1 to 10 after the first adjusting process, accordingly, the maximum difference ΔQF in the charge level QF can be made equal to the maximum charge level difference among the secondary batteries of the second battery group B before the first adjusting process and reduced than the difference ΔQ determined before the first adjusting process as shown in FIG. 45. In other words, the charge level difference between the first battery group A (the secondary battery 8) and the second battery group B (the secondary batteries 1 to 7, 9, 10) can be reduced.

However, if only the second battery group B (the secondary batteries 1 to 7, 9, 10) is charged in the aforementioned first adjusting process, the battery voltages V1 to V7, V9, and V10 of the second battery group B (the secondary batteries 1 to 7, 9, 10) greatly increase temporarily. This may result in that the maximum battery voltage difference ΔVJ among the secondary batteries 1 to 10 after the first adjusting process (a battery voltage difference between the secondary battery 8 of the first battery group A and the secondary batteries 1 and 10 whose battery voltages are highest in the second battery group B) is larger than the maximum battery voltage difference ΔV determined before the first adjusting process as shown in FIG. 46.

Figure 46:
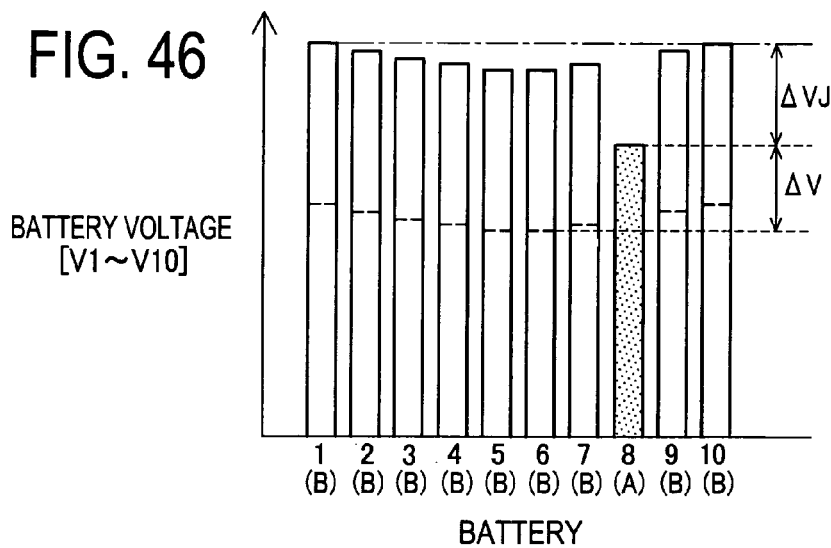
FIG. 46 is a graph showing battery voltages of the secondary batteries (first and second battery groups) after a first adjusting process in the sixth embodiment.

If the controller-equipped battery pack 50 including the battery pack 20 having been subjected to only the first adjusting process is mounted and used in the hybrid electric vehicle or the like, the battery controller 30 calculates the estimated charge level QJ based on those battery voltages V1 to V10 (see FIG. 46). Accordingly, the battery controller 30 is likely to estimate that the estimated charge level QJ of the second battery group B (the secondary batteries 1 to 7, 9, 10) after the first adjusting process is a value extremely larger than the charge level QFmin (see FIG. 45) of the second battery group B (the secondary batteries 1 to 7, 9, 10).

Consequently, regarding the estimated charge levels QJ of the secondary batteries 1 to 10 after the first adjusting process, the battery controller 30 will calculate the difference (maximum difference) ΔQJ between the maximum estimated charge level QJmax (the charge levels of the secondary batteries 1 and 10) and the minimum estimated charge level QJmin (the charge level of the secondary battery 8) and judge this maximum difference ΔQJ as exceeding the permissible range, and come to a conclusion that the charge level of the battery pack 20 is abnormal. Thus, even though the maximum difference ΔQF (see FIG. 45) among the charge levels of the secondary batteries 1 to 10 is adjusted to fall within the permissible range (e.g. within 0.2 Ah) of the battery controller 30 in the first adjusting process, the controller-equipped battery pack 50 could not be used appropriately.

In this regard, if the second battery group B (the secondary batteries 1 to 7, 9, 10) is charged in the first adjusting process and then is left to stand for a long time (e.g. several days), the battery voltages V1 to V7, V9, and V10 of the second battery group B (the secondary batteries 1 to 7, 9, 10) that have temporarily increased will be recovered (decrease). When the controller-equipped battery pack 50 is thereafter mounted and used in a hybrid electric vehicle or the like for example, the battery controller 30 will not determine that the charge level of the battery pack 20 is abnormal, under the influence of temporary increase of battery voltage. This is however low in working efficiency and could not respond to a demand for promptest use of the controller-equipped battery pack 50.

In the sixth embodiment, therefore, a second adjusting process mentioned later is conducted following the first adjusting process to enable the prompt use of the controller-equipped battery pack 50.

(Second Adjusting Process)

Figure 48:
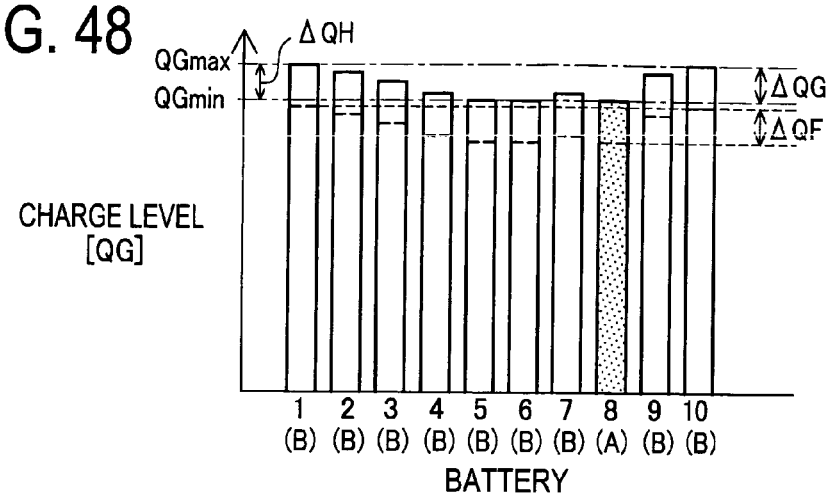
FIG. 48 is a graph showing charge levels of the secondary batteries (first and second battery groups) after a second adjusting process in the sixth embodiment.

Specifically, at step M4 (see FIG. 44) following step M3, both of the first battery group A and the second battery group B (i.e. all of the secondary batteries 1 to 10 constituting the battery pack 20) are charged by the same electric quantity ΔQH as shown in FIG. 48. To be concrete, for example, the secondary batteries 1 to 10 connected in series with one another are charged at once by use of the constant current charge and discharge device 80 (see FIG. 2).

As a result, the charge levels of the secondary batteries 1 to 10 are increased by ΔQH respectively, whereas the maximum difference ΔQG (a charge level difference between the maximum charge level QGmax and the minimum charge level QGmin) in the charge level QG among the secondary batteries 1 to 10 after the second adjusting process remains unchanged from the maximum difference ΔQF in the charge level QF before the second adjusting process (see FIG. 48).

Figure 49:
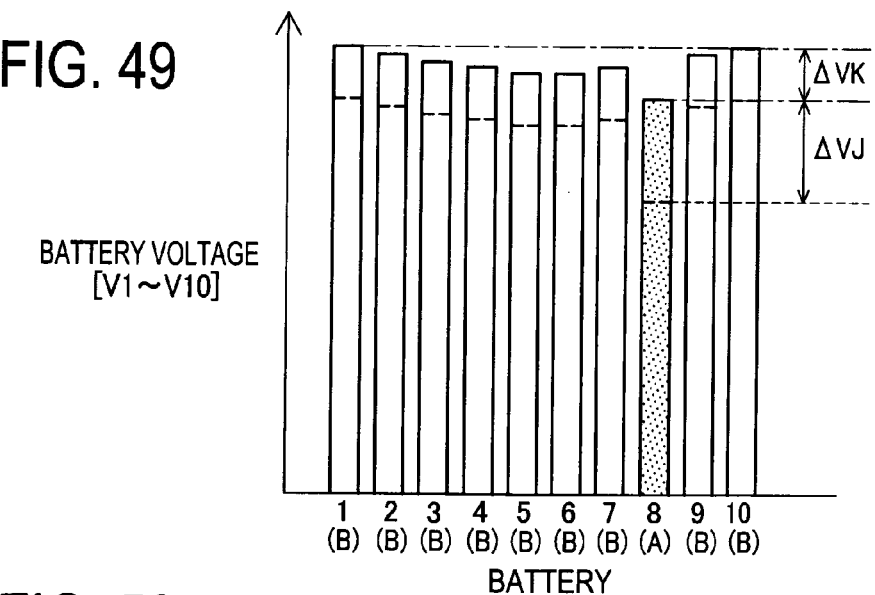
FIG. 49 is a graph showing battery voltages of the secondary batteries (first and second battery groups) after the second adjusting process in the sixth embodiment.

On the other hand, as shown in FIG. 49, the maximum battery voltage difference among the secondary batteries 1 to 10 after the second adjusting process can be reduced from ΔVJ to ΔVK. This is because the battery voltage (V8) of the first battery group A (the secondary battery 8) greatly increases by charge in the second adjusting process, whereas the battery voltages of the second battery group B (the secondary batteries 1 to 7, 9, 10) having been already charged in the first adjusting process will increase at a lower increasing rate as compared with the first battery group A even if the second battery group B is charged by the same electric quantity as in the first battery group A again in the second adjusting process.

Figure 50:
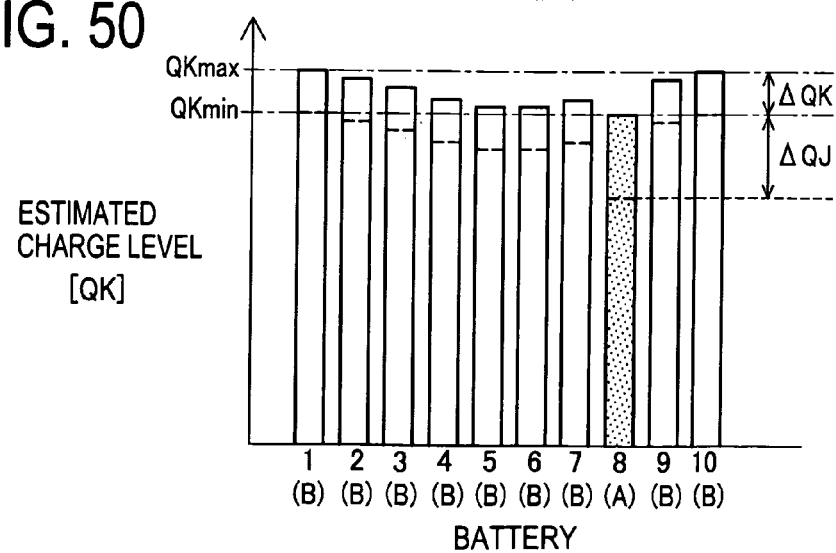
FIG. 50 is a graph showing estimated charge levels of the secondary batteries (first and second battery groups) after the second adjusting process in the sixth embodiment.

Consequently, when the controller-equipped battery pack 50 including the battery pack 20 having been subjected to the first and second adjusting processes is mounted and used in the hybrid electric vehicle or the like, the battery controller 30 calculates the estimated charge levels QK of the secondary batteries 1 to 10 (see FIG. 50) based on the battery voltages V1 to V10 with a maximum battery voltage difference reduced to ΔVK (see FIG. 49).

Figure 47:
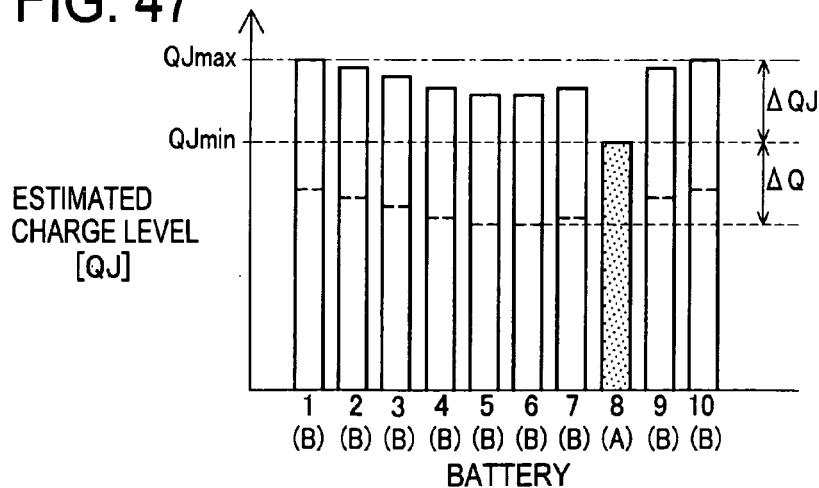
FIG. 47 is a graph showing estimated charge levels of the secondary batteries (first and second battery groups) after the first adjusting process in the sixth embodiment.

Regarding this estimated charge level QK, the maximum difference ΔQK between the maximum estimated charge level QKmax (the estimated charge levels of the secondary batteries 1 and 10) and the minimum estimated charge level QKmin (the estimated charge level of the secondary battery 8) can be reduced than the maximum difference ΔQJ (see FIG. 47) in the estimated charge level QJ before the second adjusting process. Further, the maximum difference ΔQK can be reduced than the maximum difference ΔQ (see FIG. 4) in the estimated charge level Q before adjustment and hence fall within the permissible range (e.g. 0.2 Ah) in the battery controller 30.

The controller-equipped battery pack 50 including the battery pack 20 having been subjected to the second adjusting process can be used appropriately.

According to the adjusting method in the sixth embodiment, additionally, the battery voltage difference ΔVJ among the secondary batteries 1 to 10 after the first adjusting process is reduced, so that the secondary batteries 1 to 10 do not have to be left stand for a long time. Thus, the adjustment of the battery pack 20 can be completed in a short time.

Meanwhile, because of a difference in characteristic from the second battery group B (the secondary batteries 1 to 7, 9, 10), the first battery group A (the secondary battery 8) is apt to gradually increase the charge level during subsequent use (charge and discharge) as compared with the second battery group B even if the charge level is adjusted in the above manner. Thus, the charge level of the first battery group A may become higher than that of the second battery group B again.

In the adjusting method in the sixth embodiment, accordingly, the charge levels QFmin of the secondary batteries 5 and 6 whose charge level are lowest in the second battery group B (the secondary batteries 1 to 7, 9, 10) are adjusted as above to be equal to the charge level of the first battery group A (the secondary battery 8) in the first adjusting process (see FIG. 6). In this way, it is possible to delay the time until the charge level of the first battery group A (the secondary battery 8) increases due to the subsequent use (charge and discharge) than that of the second battery group B (the secondary batteries 1 to 7, 9, 10) again, that is, until the estimated charge level Q is returned to the condition shown in FIG. 4 again. Accordingly, the battery pack 20 can be used properly over a longer period.

Embodiment 7

A seventh embodiment of the invention will be explained below. The seventh embodiment differs in only the adjusting method of the battery pack and are identical in other configurations to those in the fourth embodiment. Accordingly, the following explanation will be made with a focus on the differences from the fourth embodiment and the explanation of other configurations will not be omitted or will be simplified.

Figure 51:
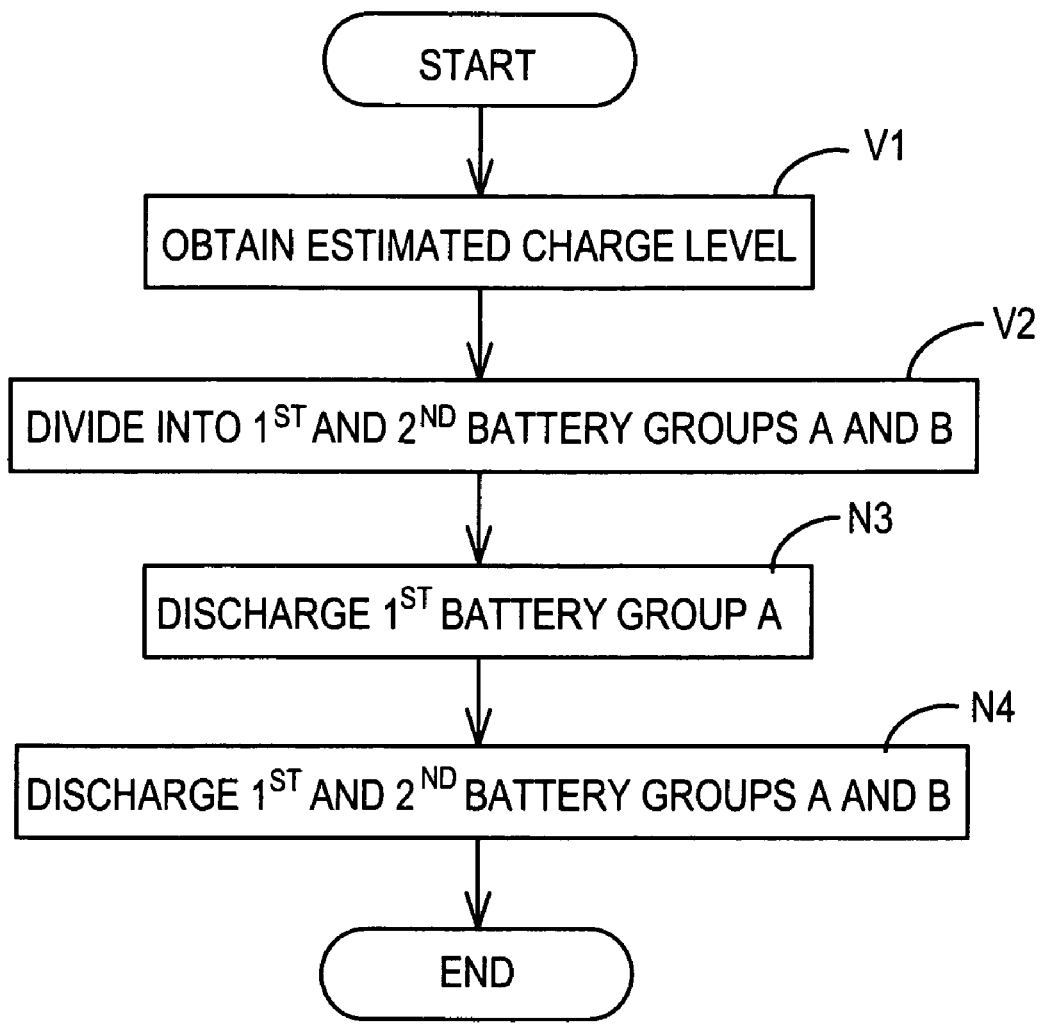
FIG. 51 is a flowchart showing the flow of an adjusting process of a battery pack in a seventh embodiment.

FIG. 51 is a flowchart showing the flow of an adjusting process of a battery pack in the seventh embodiment.

At step V1, as in the fourth embodiment, the estimated charge levels (see FIG. 27) of the secondary batteries 101 to 110 constituting the battery pack 120 are obtained. At step V2, the secondary batteries 101 to 110 are divided into a first battery group A and a second battery group B according to the degrees of the obtained estimated charge levels Q of the secondary batteries 101 to 110. In the seventh embodiment, as in the fourth embodiment, the secondary batteries 101 to 107, 109, and 110 are assumed as the first battery group A and the secondary battery 108 is assumed as the second battery group B.

(First Adjusting Process)

Figure 52:
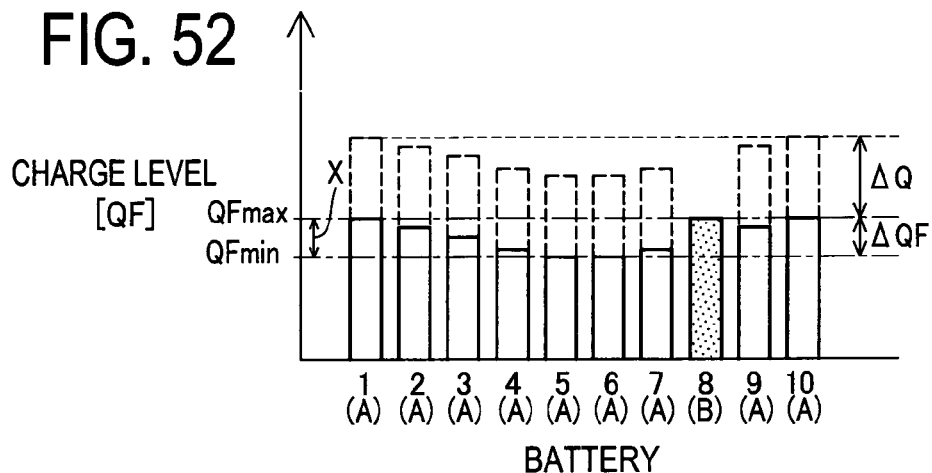
FIG. 52 is a graph showing charge levels of secondary batteries (first and second battery groups) after a first adjusting process in the seventh embodiment.

At step N3 (see FIG. 51), the secondary batteries 101 to 107, 109, 110 of the first battery group A are discharged by the same electric quantity respectively so that the charge level of the second battery group B (the secondary battery 108) falls within a charge level range X determined based on the charge level of the first battery group A after discharge as shown in FIG. 52. In the seventh embodiment, the charge level range X is defined as a range from a lowest charge level to a highest charge level of the charge levels of the first battery group A. In the seventh embodiment, as shown in FIG. 52, the charge level of the second battery group B is adjusted to be equal to the charge levels QFmax of the secondary batteries 101 and 110 whose charge levels are highest in the first battery group A. To be concrete, the secondary batteries 101 to 107, 109, 110 of the first battery group A electrically connected in series are discharged by ΔQ at the same time.

FIGS. 52 to 57 indicate the secondary batteries 101 to 110 by using shortened numerals 1 to 10. The charge level range X is set to meet the permissible range (e.g., 0.2 Ah) of the charge level permissible in the battery controller 30. Further, $\Delta Q$ represents a difference (maximum difference) between the maximum estimated charge level Qmax (the charge levels of the secondary batteries 101 and 110 in the seventh embodiment) and the minimum estimated charge level Qmin (the charge level of the secondary battery 8 in the seventh embodiment) of the estimated charge level Q of the secondary batteries 101 to 110 before the first adjusting process (see FIG. 27).

Regarding the secondary batteries 101 to 110 after the first adjusting process, accordingly, the maximum difference $\Delta QF$ in the charge level QF can be made equal to the maximum charge level difference among the secondary batteries of the first battery group A before the first adjusting process and reduced than the difference $\Delta Q$ before the first adjusting process. In other words, the charge level difference between the first battery group A (the secondary batteries 101 to 107, 109, 110) and the second battery group B (the secondary battery 108) can be reduced.

However, if only the first battery group A (the secondary batteries 101 to 107, 109, 110) is discharged in the aforementioned first adjusting process, the battery voltages V1 to V7, V9, and V10 of the first battery group A greatly decreases temporarily. This may result in that the maximum battery voltage difference $\Delta VJ$ among the secondary batteries 101 to 110 after the first adjusting process (a battery voltage difference between the secondary battery 108 of the second battery group B and the secondary batteries 105 and 106 whose battery voltages are lowest in the first battery group A) is larger than the maximum battery voltage difference $\Delta V$ before the first adjusting process as shown in FIG. 53.

Figure 53:
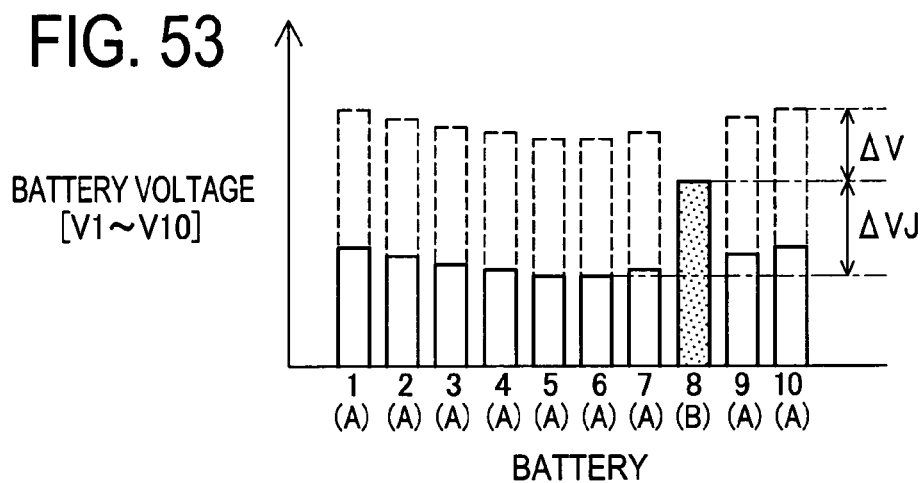
FIG. 53 is a graph showing battery voltages of the secondary batteries (first and second battery groups) after the first adjusting process in the seventh embodiment.
Figure 54:
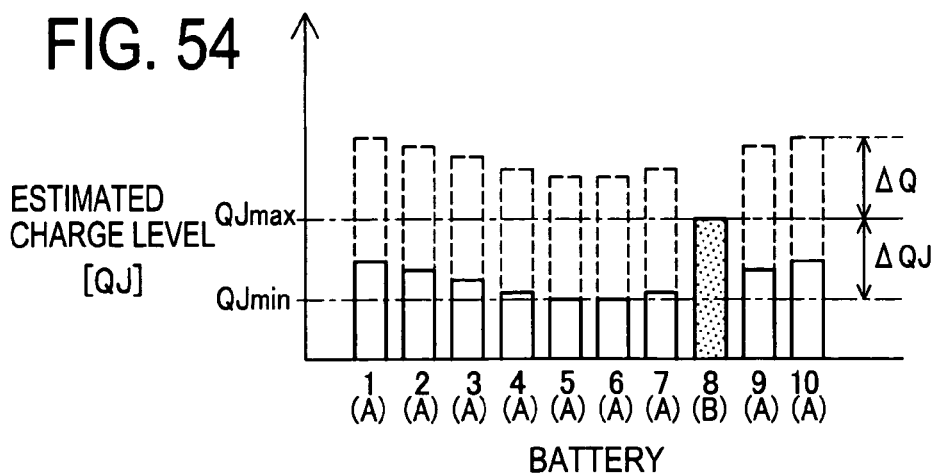
FIG. 54 is a graph showing estimated charge levels of the secondary batteries (first and second battery groups) after the first adjusting process in the seventh embodiment.

If the controller-equipped battery pack 150 including the battery pack 120 having been subjected to only the first adjusting process is mounted and used in the hybrid electric vehicle or the like, the battery controller 30 calculates the estimated charge level QJ based on the battery voltages V1 to V10 (see FIG. 53). Accordingly, the battery controller 30 is likely to estimate that the estimated charge level QJ of the first battery group A (the secondary batteries 101 to 107, 109, 110) after the first adjusting process is a value extremely smaller than the charge level QF (see FIG. 52) of the first battery group A (the secondary batteries 101 to 107, 109, 110) as shown in FIG. 54.

Consequently, regarding the estimated charge levels QJ of the secondary batteries 101 to 110 after the first adjusting process, the battery controller 30 will calculate the difference (maximum difference) $\Delta QJ$ between the maximum estimated charge level QJmax (the estimated charge level of the secondary battery 108) and the minimum estimated charge level QJmin (the estimated charge level of the secondary batteries 105 and 106) and judge this maximum difference $\Delta QJ$ as exceeding the permissible range, and determine that the charge level of the battery pack 120 is abnormal. Thus, even though the maximum difference $\Delta QF$ (see FIG. 52) among the charge levels QF of the secondary batteries 101 to 110 is adjusted to fall within the permissible range (e.g. within 0.2 Ah) of the battery controller 30 in the first adjusting process, the controller-equipped battery pack 150 could not be used appropriately.

In this regard, if the first battery group A (the secondary batteries 101 to 107, 109, 110) is charged in the first adjusting process and then is left to stand for a long time (e.g. several days), the battery voltages V1 to V7, V9, and V 10 of the first battery group A that have temporarily decreased will be recovered. When the controller-equipped battery pack 150 is thereafter mounted and used in a hybrid electric vehicle or the like for example, the battery controller 30 will not determine that the charge level is abnormal, under the influence of temporary decrease of battery voltage. This is however low in working efficiency and could not respond to a demand for promptest use of the controller-equipped battery pack 150.

In the seventh embodiment, therefore, a second adjusting process mentioned later is conducted following the first adjusting process to enable the prompt use of the controller-equipped battery pack 150.

(Second Adjusting Process)

Figure 55:
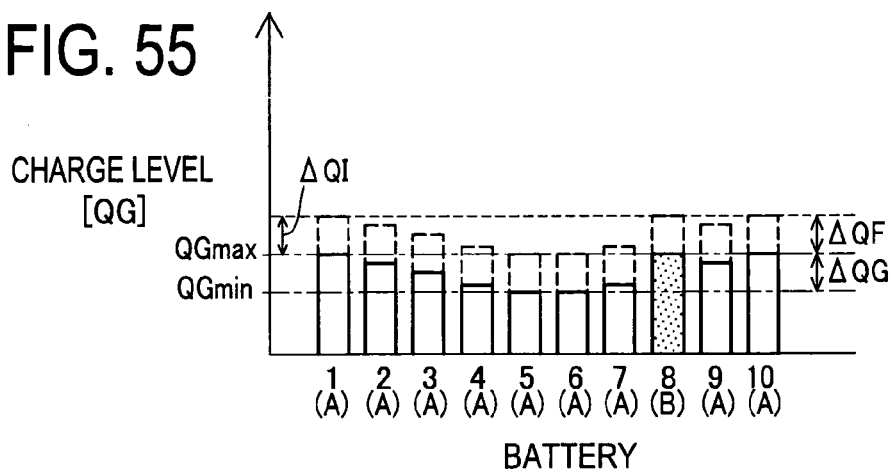
FIG. 55 is a graph showing charge levels of the secondary batteries (first and second battery groups) after a second adjusting process in the seventh embodiment.

Specifically, at step N4 (see FIG. 51) following step N3, both of the first battery group A and the second battery group B (i.e. all of the secondary batteries 101 to 110 constituting the battery pack 120) are discharged by the same electric quantity $\Delta QI$ as shown in FIG. 55. To be concrete, for example, the secondary batteries 101 to 110 electrically connected in series are discharged by $\Delta QI$ at once by use of the constant current charge and discharge device 80 (see FIG. 2).

As a result, the charge levels of the secondary batteries 101 to 110 are decreased by $\Delta QI$ respectively, whereas the maximum difference $\Delta QG$ (a charge level difference between the maximum charge level QGmax and the minimum charge level QGmin) in the charge level QG among the secondary batteries 101 to 110 after the second adjusting process remains unchanged from the maximum difference $\Delta QF$ in the charge level QF before the second adjusting process.

Figure 56:
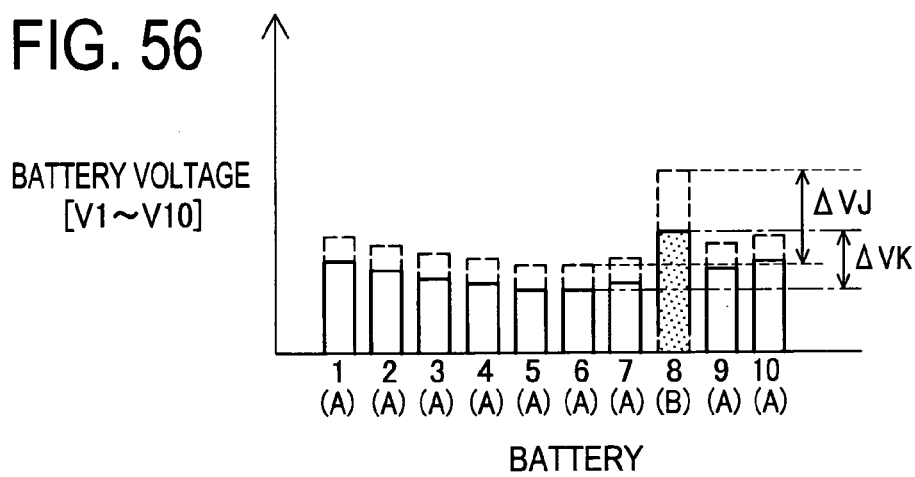
FIG. 56 is a graph showing battery voltages of the secondary batteries (first and second battery groups) after the second adjusting process in the seventh embodiment.
Figure 57:
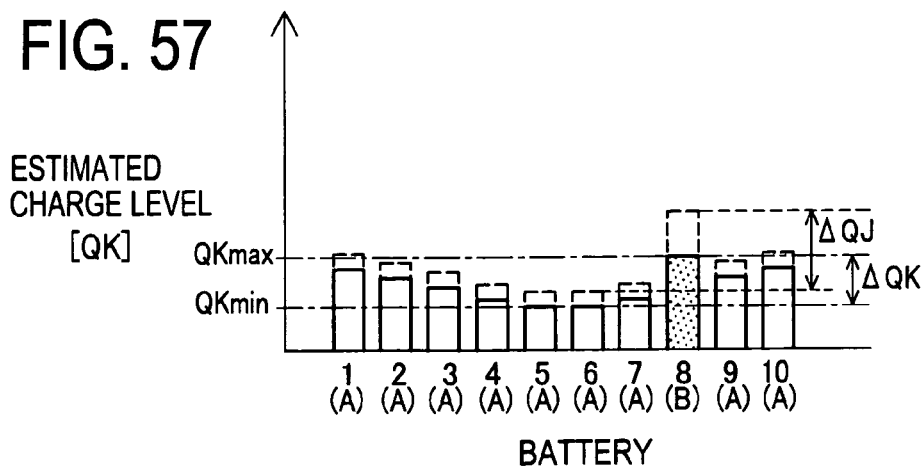
FIG. 57 is a graph showing estimated charge levels of the secondary batteries (first and second battery groups) after the second adjusting process in the seventh embodiment.

On the other hand, as shown in FIG. 56, the maximum battery voltage difference among the secondary batteries 101 to 110 after the second adjusting process can be reduced from $\Delta VJ$ to $\Delta VK$. This is because the battery voltage (V8) of the second battery group B (the secondary battery 108) greatly decreases by discharge in the second adjusting process, whereas the battery voltage of the first battery group A (the secondary batteries 101 to 107, 109, 110) having been already discharged in the first adjusting process will decrease at a lower decreasing rate as compared with the second battery group B even if the first battery group A is discharged again by the same electric quantity as in the second battery group B in the second adjusting process.

Consequently, when the controller-equipped battery pack 150 provided with the battery pack 120 having been subjected to the first and second adjusting processes is mounted and used in the hybrid electric vehicle or the like, the battery controller 30 calculates the estimated charge levels QK of the secondary batteries 101 to 110 (see FIG. 57) based on the battery voltages V1 to V10 with a maximum battery voltage difference reduced to $\Delta VK$ (see FIG. 56).

Regarding this estimated charge level QK, the maximum difference $\Delta QK$ between the maximum estimated charge level QKmax (the estimated charge level of the secondary battery 108) and the minimum estimated charge level QKmin (the estimated charge levels of the secondary batteries 105 and 106) can be reduced as compared with the maximum difference $\Delta QJ$ in the estimated charge level QJ before the second adjusting process. Further, it can be reduced than the maximum difference $\Delta Q$ (see FIG. 27) in the estimated charge level Q before adjustment and hence fall within the permissible range (e.g. 0.2 Ah) in the battery controller 30.

The controller-equipped battery pack 150 including the battery pack 120 having been subjected to the second adjusting process can be used appropriately.

According to the adjusting method in the seventh embodiment, additionally, the battery voltage difference $\Delta VJ$ among the secondary batteries 101 to 110 after the first adjusting process is reduced, so that the secondary batteries 101 to 110 do not have to be left stand for a long time. Thus, the adjustment of the battery pack 120 can be completed in a short time.

Meanwhile, because of a difference in characteristic from the first battery group A (the secondary batteries 101 to 107, 109, 110), the second battery group B (the secondary battery 108) is apt to gradually decrease the charge level during subsequent use (charge and discharge) as compared with the first battery group A even if the charge level is adjusted in the above manner. Thus, the charge level of the second battery group B may become lower than that of the first battery group A again.

In the adjusting method in the seventh embodiment, therefore, the charge level of the second battery group B (the secondary battery 108) is adjusted to be equal to the charge level QFmax of the secondary batteries 101 and 110 whose charge level are highest in the first battery group A (the secondary batteries 101 to 107, 109, 110) (see FIG. 52) in the first adjusting process. In this way, it is possible to delay the time until the charge level of the second battery group B decreases due to the subsequent use (charge and discharge) than that of the first battery group A again, that is, until the estimated charge level Q is returned to the condition shown in FIG. 27 again. Accordingly, the battery pack 120 can be used properly over a longer period.

The present invention is explained above along the first to seven embodiments but is not limited thereto. The present invention may be embodied in other specific forms without departing from the essential characteristics thereof.

For instance, in the first embodiment, the first battery group A (the secondary battery 8) is discharged at step S3 (the first adjusting process). An alternative is to charge the secondary batteries 1 to 7, 9, 10 of the second battery group B by the same electric quantity respectively to make the charge levels of the secondary batteries 5 and 6 whose charge levels are lowest in the second battery group B equal to the charge level of the first battery group A (the secondary battery 8).

In the first embodiment, the first battery group A and the second battery group B are discharged at step S4 (the second adjusting process), but they may be charged by the same electric quantity instead.

In the second embodiment, the step T4 (the second battery group adjusting process) is conducted following the step T3 (the first battery group adjusting process). Alternatively, the step T4 (the second battery group adjusting process) may be conducted prior to the step T3 (the first battery group adjusting process).

In the third embodiment, the step U4 (the first battery group adjusting process) is conducted following the step U3 (the second battery group adjusting process). Alternatively, the step U4 (the first battery group adjusting process) may be conducted prior to the step U3 (the second battery group adjusting process).

In the fourth embodiment, the second battery group B (the secondary battery 108) is charged at step V3 (the first adjusting process). An alternative is to discharge the secondary batteries 101 to 107, 109, 110 of the first battery group A by the same electric quantity to make the charge level of the second battery group B equal to the charge levels of the secondary batteries 101 and 110 whose charge levels are highest in the first battery group A.

In the fourth embodiment, the first battery group A and the second battery group B are charged at step V4 (the second adjusting process), but they may be discharged by the same electric quantity.

In the fifth embodiment, the first battery group A (the secondary batteries 201 and 210) is discharged at step W3 (the first adjusting process). An alternative is to charge the batteries of the second battery group B (the secondary batteries 202 to 209) by the same electric quantity to make the charge level of the first battery group A equal to the charge levels of the secondary batteries 205 and 206 whose charge levels are lowest in the second battery group B.

In the fifth embodiment, further, the first battery group A and the second battery group B are discharged at step W4 (the second adjusting process), but they may be charged by the same electric quantity.

In the first to seventh embodiments, the adjustment of charge level of the battery pack (the first and second adjusting processes or the first and second battery adjusting processes) is conducted after the battery controller 30 detects that the charge level is abnormal. The adjustment may be performed prior to the detection of abnormality in charge level. For instance, it may be arranged to check the estimated charge level Q of the secondary batteries constituting the battery pack by use of the data monitor 60 in every periodic inspection of a vehicle or the like and adjust the charge level if the maximum difference ΔQ in the estimated charge level Q is a predetermined value (e.g. 0.1 Ah) or more even where it is within the permissible range (e.g. 0.2 Ah). This makes it possible to detect the abnormality in charge level during operation of the vehicle or the like and avoid the generation of a warning or the like.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of adjusting a battery pack including a plurality of secondary batteries divided into a first battery group and a second battery group according to charge levels before adjustment so that the first battery group includes one or more secondary batteries each having a high charge level and the secondary group includes two or more secondary batteries each having a lower charge level than that of the first battery group, the method being adapted to reduce a difference in charge level between the one or more secondary batteries of the first battery group and the two or more secondary batteries of the second battery group, the method comprising:
a first adjusting process for discharging the one or more secondary batteries of the first battery group so that the charge level of the one or more secondary batteries of the first battery group falls within a charge level range determined based on the charge level of the two or more secondary batteries of the second battery group; and
a second adjusting process for discharging all the secondary batteries of the first and second battery groups by a same electric quantity, respectively, to reduce a battery voltage difference between the one or more secondary batteries of the first battery group and the one or more secondary batteries of the second battery group, wherein
the rate of discharge of the battery voltages of the first battery group is different than the rate of discharge of the battery voltages of the second battery group during the second adjusting process,
and the plurality of secondary batteries of the battery pack are electrically connected in series to each other.

2. The battery pack adjusting method according to claim 1, wherein
the first adjusting process includes making the charge level of at least one secondary battery of the first battery group equal to the charge level of a secondary battery whose charge level is lowest in the second battery group.

3. The method of adjusting a battery pack according to claim 1, the first adjusting process includes discharging the secondary batteries of the first battery group by the same electric quantity respectively so that the charge level of the two or more secondary batteries of the second battery group falls within a charge level range determined based on a charge level of the secondary batteries of the first battery group after discharge.

4. A method of adjusting a battery pack with a controller, the battery pack with a controller comprising a battery pack including a plurality of secondary batteries electrically connected, and a battery controller adapted to estimate each charge level of the secondary batteries based on each battery voltage and detect abnormality in the secondary batteries based on each estimated charge level, the method comprising:

assuming each charge level of the secondary batteries estimated by the battery controller to be a charge level before adjustment and dividing the secondary batteries into the first battery group and the second battery group; and reducing a difference in charge level between the secondary batteries of the first battery group and the secondary batteries of the second battery group according to the adjusting method set forth in claim 1.

* * * * *